United States Patent
Moriya et al.

(10) Patent No.: US 9,462,271 B2
(45) Date of Patent: Oct. 4, 2016

(54) MOVING IMAGE ENCODING DEVICE, MOVING IMAGE DECODING DEVICE, MOVING IMAGE CODING METHOD, AND MOVING IMAGE DECODING METHOD

(75) Inventors: Yoshimi Moriya, Tokyo (JP); Shunichi Sekiguchi, Tokyo (JP); Kazuo Sugimoto, Tokyo (JP); Ryoji Hattori, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 525 days.

(21) Appl. No.: 13/810,072

(22) PCT Filed: Jul. 7, 2011

(86) PCT No.: PCT/JP2011/003907
§ 371 (c)(1),
(2), (4) Date: Jan. 14, 2013

(87) PCT Pub. No.: WO2012/008125
PCT Pub. Date: Jan. 19, 2012

(65) Prior Publication Data
US 2013/0114700 A1 May 9, 2013

(30) Foreign Application Priority Data
Jul. 15, 2010 (JP) .................................. 2010-160647

(51) Int. Cl.
*H04N 7/26* (2006.01)
*H04N 19/50* (2014.01)
(Continued)

(52) U.S. Cl.
CPC ...... *H04N 19/00569* (2013.01); *H04N 19/105* (2014.11); *H04N 19/11* (2014.11);
(Continued)

(58) Field of Classification Search
CPC .................... H04N 19/00569; H04N 19/105; H04N 19/11; H04N 19/182; H04N 19/186; H04N 19/198; H04N 19/463; H04N 19/593; H04N 19/96
See application file for complete search history.

(56) References Cited

U.S. PATENT DOCUMENTS 7,492,950 B2 * 2/2009 Suzuki ................ H04N 11/044
382/232
8,976,862 B2 3/2015 Kim et al.
(Continued)

FOREIGN PATENT DOCUMENTS

JP 2007-150913 A 6/2007
JP 2008-245088 A 10/2008
(Continued)

OTHER PUBLICATIONS

Jeon et al., "Description of video coding technology proposal by LG Electronics," Joint Collaborative Team on Video Coding (JCT-VC) of ITU-T SG16 WP3 and ISO/IEC JTC1/SC29/WG11, Document: JCTVC-A110, 1st Meeting, Dresden, Germany, Apr. 15-23, 2010, pp. 1-37.
(Continued)

*Primary Examiner* — Dave Czekaj
*Assistant Examiner* — Md Haque
(74) *Attorney, Agent, or Firm* — Birch, Stewart, Kolasch & Birch, LLP

(57) ABSTRACT

When generating a prediction image of a color difference signal, an intra prediction unit 4 carries out an intra prediction process on a target block to be encoded of a color difference signal by using the same intra prediction parameter as that which the intra prediction unit 4 uses when carrying out an intra prediction process on a target block to be encoded of a luminance signal, or carries out the intra prediction process on the target block to be encoded of the color difference signal by applying an average prediction to the target block to be encoded. A variable length encoding unit 13 variable-length-encodes a flag showing whether the intra prediction unit 4 uses the same intra prediction parameter as that used for the luminance signal.

5 Claims, 14 Drawing Sheets

(51) Int. Cl.
*H04N 19/105* (2014.01)
*H04N 19/96* (2014.01)
*H04N 19/593* (2014.01)
*H04N 19/11* (2014.01)
*H04N 19/463* (2014.01)
*H04N 19/186* (2014.01)
*H04N 19/182* (2014.01)
*H04N 19/196* (2014.01)

(52) U.S. Cl.
CPC ......... *H04N 19/182* (2014.11); *H04N 19/186* (2014.11); *H04N 19/198* (2014.11); *H04N 19/463* (2014.11); *H04N 19/593* (2014.11); *H04N 19/96* (2014.11)

(56) References Cited

U.S. PATENT DOCUMENTS

| 2008/0240238 | A1 | 10/2008 | Yoshino et al. | |
|---|---|---|---|---|
| 2009/0003441 | A1 | 1/2009 | Sekiguchi et al. | |
| 2009/0034857 | A1* | 2/2009 | Moriya | H04N 19/176 382/238 |
| 2009/0110070 | A1 | 4/2009 | Takahashi et al. | |
| 2010/0260261 | A1* | 10/2010 | Kotaka | H04N 19/176 375/240.13 |

FOREIGN PATENT DOCUMENTS

| JP | 2009-27759 A | 2/2009 |
|---|---|---|
| JP | 2009-111691 A | 5/2009 |
| KR | 10-2007-0077609 A | 7/2007 |
| WO | WO 2008/123254 A1 | 10/2008 |
| WO | WO 2009/120040 A2 | 10/2009 |

OTHER PUBLICATIONS

Kim et al., "Color Format Extension," Joint Video Team (JVT) of ISO/IEC MPEG & ITU-T VCEG (ISO/IEC JTC1/SC29/WG11 and ITU-T SG16 Q.6), Document: JVT-H018, 8th Meeting, Geneva, Switzerland, May 23-27, 2003, pp. 1-17.

ITU-T H.264, "Advanced video coding for generic audiovisual services", Series H: Audiovisual and Multimedia Systems, Infrastructure of audiovisual services—Coding of moving video, 2012.

McCann, et al., "Samsung's Response to the Call for Proposals on Video Compression Tehcnology", 1st Meeting: Dresden, DE, Apr. 15-25, 2010; Document: JCTVC-A124, pp. 1-42.

JCT-VC, "Test Model under Consideration," Joint Collaborative Team on Video Coding (JCT-VC) of ITU-T SG16 WP3 and ISO/IEC JTC1/SC29/WG11, 1st Meeting, Document JCTVC-A205, Dresden, Germany, Apr. 15-23, 2010, 40 pages.

\* cited by examiner

FIG.6
| Intra Prediction Mode Index | Intra Prediction Mode |
|---|---|
| 0 | Vertical Prediction |
| 1 | Horizontal Prediction |
| 2 | Average Prediction |
| 3～N-1 | Diagonal Prediction |
N: Number of Intra Prediction Modes
Directional Predictions in Case of N=9 (8 Modes)
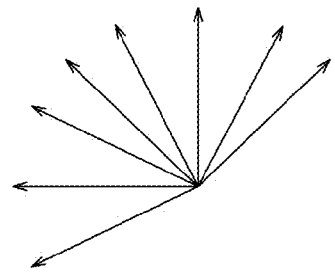
Directional Predictions in Case of N=17 (16 Modes)
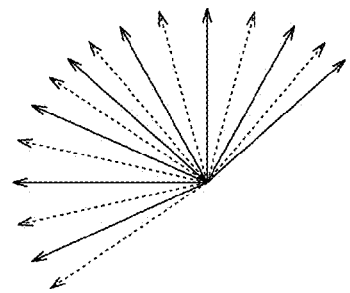
Directional Prediction in Case of N=33 (32 Modes)
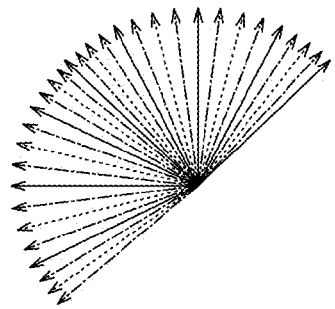

MOVING IMAGE ENCODING DEVICE, MOVING IMAGE DECODING DEVICE, MOVING IMAGE CODING METHOD, AND MOVING IMAGE DECODING METHOD

FIELD OF THE INVENTION

The present invention relates to a moving image encoding device for, a moving image decoding device for, a moving image encoding method of, and a moving image decoding method of carrying out an intra prediction process or an inter prediction process to carry out predictive encoding.

BACKGROUND OF THE INVENTION

Intra prediction modes for use in an AVC/H.264 encoding method, each of which can be set in an intra prediction processes carried out by a moving image encoding device, will be explained. One intra prediction mode for luminance can be selected for each block unit from among a plurality of prediction modes. FIG. 15 is an explanatory drawing showing intra prediction modes in the case of a 4×4 pixel block size for luminance. In the case of a 4×4 pixel block size for luminance, nine intra prediction modes including a mode 0 to a mode 8 are defined.

In the example of FIG. 15, each white circle shows a pixel in a block to be encoded, and each black circle shows a pixel that is used for prediction, and that exists in an already-encoded adjacent block. The mode 2 is an intra prediction mode associated with an average prediction in which each pixel in the target block to be encoded is predicted by using the average of adjacent pixels existing in the upper and left blocks. The modes other than the mode 2 are intra prediction modes associated with a directional prediction.

The mode 0 is an intra prediction mode associated with a vertical prediction in which adjacent pixels in the upper block are repeatedly replicated to create plural rows of pixels along a vertical direction to generate a prediction image. For example, the mode 0 is selected when the target block to be encoded is a vertically striped pattern. Further, the mode 1 is an intra prediction mode associated with a horizontal prediction in which adjacent pixels in the left block are repeatedly replicated to create plural columns of pixels along a horizontal direction to generate a prediction image. In each of the modes 3 to 8, interpolation pixels running in a predetermined direction (i.e., a direction shown by arrows) are generated by using the adjacent pixels in the upper block or the left block to generate a prediction image.

In this case, the block size for luminance to which an intra prediction is applied can be selected from 4×4 pixels, 8×8 pixels, and 16×16 pixels. In the case of 8×8 pixels, nine intra prediction modes are defined, like in the case of 4×4 pixels. In contrast with this, in the case of 16×16 pixels, four intra prediction modes which are called plane predictions are defined in addition to intra prediction modes associated with an average prediction, a vertical prediction, and a horizontal prediction. Each intra prediction mode associated with a plane prediction is a mode in which pixels created by carrying out an interpolation in a diagonal direction on the adjacent pixels in the upper block and the adjacent pixels in the left block are provided as predicted values.

In a directional prediction mode in the case of a block size of 4×4 pixels or 8×8 pixels, because predicted values are generated along a predetermined direction (e.g., a direction of 45 degrees), the prediction efficiency increases and the code amount can be reduced when the direction of a boundary (edge) of an object in a block matches the direction shown by the prediction mode. However, when the direction of an edge of an object in a block does not match the direction shown by the prediction mode, the code amount cannot be reduced because the prediction efficiency decreases. The following patent reference 1 discloses a technology capable of reducing the code amount related to intra prediction modes by simply using a frequency information table for storing the counted frequency of occurrence of an intra prediction mode. However, it is necessary to prepare the frequency information table in advance.

RELATED ART DOCUMENT

Patent Reference

Patent reference 1: WO 2008/123254

SUMMARY OF THE INVENTION

Problems to be Solved by the Invention

Because the conventional moving image encoding device is constructed as above, increase in the number of selectable directional prediction modes increases the probability that the direction of an edge matches the direction shown by a prediction mode, and hence the prediction efficiency can be improved. A problem is, however, that the increase in the number of selectable directional prediction modes causes an increase in the code amount of information about intra prediction modes.

The present invention is made in order to solve the above-mentioned problem, and it is therefore an object of the present invention to provide a moving image encoding device and a moving image encoding method capable of reducing the increase in the code amount of information about intra prediction modes. It is another object of the present invention is to provide a moving image decoding device and a moving image decoding method which can be applied to the above-mentioned moving image encoding device and the above-mentioned moving image encoding method.

Means for Solving the Problem

In accordance with the present invention, there is provided an image encoding device in which when generating a prediction image of a color difference signal, a prediction image generating unit carries out an intra prediction process on a target block to be encoded of the color difference signal by using an intra prediction parameter which is the same as an intra prediction parameter which the prediction image generating unit uses when carrying out the intra prediction process on a target block to be encoded of a luminance signal, or carries out the intra prediction process on the target block to be encoded of the color difference signal by applying an average prediction to the target block to be encoded, and a variable length encoding unit variable-length-encodes a flag showing whether the prediction image generating unit carries out the intra prediction process on the target block to be encoded of the color difference signal by using the same intra prediction parameter as that used for the luminance signal as the intra prediction parameter which the prediction image generating unit uses when carrying out the intra prediction process on the target block to be encoded of the color difference signal.

Advantages of the Invention

Because the image encoding device in accordance with the present invention is constructed in such a way that when generating a prediction image of a color difference signal, the prediction image generating unit carries out the intra prediction process on the target block to be encoded of the color difference signal by using the intra prediction parameter which is the same as the intra prediction parameter which the prediction image generating unit uses when carrying out the intra prediction process on the target block to be encoded of the luminance signal, or carries out the intra prediction process on the target block to be encoded of the color difference signal by applying an average prediction to the target block to be encoded, and the variable length encoding unit variable-length-encodes the flag showing whether the prediction image generating unit carries out the intra prediction process on the target block to be encoded of the color difference signal by using the same intra prediction parameter as that used for the luminance signal as the intra prediction parameter which the prediction image generating unit uses when carrying out the intra prediction process on the target block to be encoded of the color difference signal, there is provided an advantage of being able to reduce the code amount related to the intra prediction mode of each of the color difference signals without reducing the prediction efficiency.

BRIEF DESCRIPTION OF THE FIGURES

FIG. 6 is an explanatory drawing showing an example of an intra prediction parameter (intra prediction mode) which can be selected for each partition P$_i^n$ in a target block to be encoded B$^n$;

FIG. 15 is an explanatory drawing showing intra prediction modes in the case of a 4×4 pixel block size for luminance.

EMBODIMENTS OF THE INVENTION

Hereafter, in order to explain this invention in greater detail, the preferred embodiments of the present invention will be described with reference to the accompanying drawings.

Embodiment 1

Figure 1:
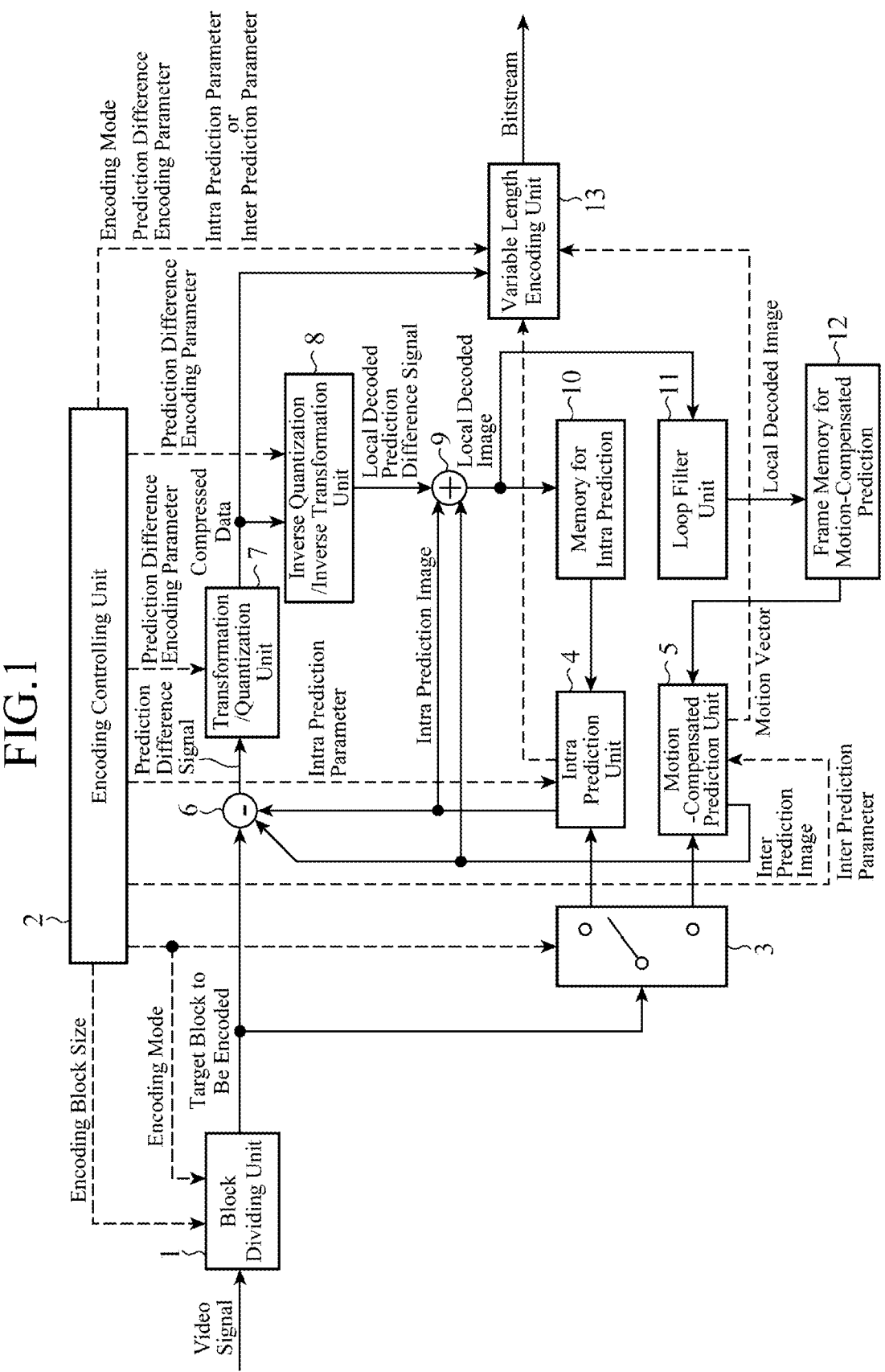
FIG. 1 is a block diagram showing a moving image encoding device in accordance with Embodiment 1 of the present invention.

FIG. 1 is a block diagram showing a moving image encoding device in accordance with Embodiment 1 of the present invention. Referring to FIG. 1, when receiving a video signal showing an inputted image, a block dividing unit 1 divides the inputted image into blocks (blocks each of which is a prediction unit) each having an encoding block size determined by an encoding controlling unit 2, and carries out a process of outputting a target block to be encoded which is a block which is a prediction unit. The block dividing unit 1 constructs a block dividing unit.

The encoding controlling unit 2 carries out a process of determining an encoding mode with the highest encoding efficiency for the target block to be encoded outputted from the block dividing unit 1 from among one or more selectable intra encoding modes and one or more selectable inter encoding modes while determining an encoding block size. The encoding controlling unit 2 also carries out a process of, when the encoding mode with the highest encoding efficiency is an intra encoding mode, determining an intra prediction parameter which the moving image encoding device uses when carrying out an intra prediction process on the target block to be encoded in the intra encoding mode, and, when the encoding mode with the highest encoding efficiency is an inter encoding mode, determining an inter prediction parameter which the moving image encoding device uses when carrying out an inter prediction process on the target block to be encoded in the inter encoding mode. The encoding controlling unit 2 further carries out a process of determining a prediction difference encoding parameter which the encoding controlling unit provides for a transformation/quantization unit 7 and an inverse quantization/inverse transformation unit 8. The encoding controlling unit 2 constructs an encoding controlling unit.

A select switch 3 carries out a process of, when the encoding mode determined by the encoding controlling unit 2 is an intra encoding mode, outputting the target block to be encoded outputted from the block dividing unit 1 to an intra prediction unit 4, and, when the encoding mode determined by the encoding controlling unit 2 is an inter encoding mode, outputting the target block to be encoded outputted from the block dividing unit 1 to a motion-compensated prediction unit 5.

The intra prediction unit 4 carries out a process of carrying out the intra prediction process on the target block to be encoded outputted from the select switch 3 by using the intra prediction parameter determined by the encoding controlling unit 2 while referring to a local decoded image stored in a memory 10 for intra prediction to generate an intra prediction image (prediction image). A prediction image generating unit is comprised of the select switch 3, the intra prediction unit 4, and the memory 10 for intra prediction.

The motion-compensated prediction unit 5 carries out a process of comparing the target block to be encoded outputted from the select switch 3 with the local decoded image on which a filtering process is performed and which is stored in a motion-compensated prediction frame memory 12 to search for a motion vector, and generating an inter prediction image by carrying out the inter prediction process (motion-compensated prediction process) on the target block to be encoded by using both the motion vector and the inter prediction parameter determined by the encoding controlling unit 2.

A subtraction unit 6 carries out a process of subtracting the intra prediction image generated by the intra prediction unit 4 or the inter prediction image generated by the motion-compensated prediction unit 5 from the target block to be encoded outputted from the block dividing unit 1 to output a prediction difference signal (difference image) which is the result of the subtraction to a transformation/quantization unit 7. The transformation/quantization unit 7 carries out a process of carrying out an orthogonal transformation process (e.g., a DCT (discrete cosine transform) or an orthogonal transformation process, such as a KL transform, in which bases are designed for a specific learning sequence in advance) on the prediction difference signal outputted from the subtraction unit 6 by referring to the prediction difference encoding parameter determined by the encoding controlling unit 2 to calculate transform coefficients, and also quantizing the transform coefficients by referring to the prediction difference encoding parameter and then outputting compressed data which are the transform coefficients quantized thereby (quantization coefficients of the difference image) to an inverse quantization/inverse transformation unit 8 and a variable length encoding unit 13. A quantizing unit is comprised of the subtraction unit 6 and the transformation/quantization unit 7.

The inverse quantization/inverse transformation unit 8 carries out a process of inverse-quantizing the compressed data outputted from the transformation/quantization unit 7 by referring to the prediction difference encoding parameter determined by the encoding controlling unit 2, and also carrying out an inverse orthogonal transformation process on the transform coefficients which are the compressed data inverse-quantized thereby by referring to the prediction difference encoding parameter to calculate a local decoded prediction difference signal corresponding to the prediction difference signal outputted from the subtraction unit 6. An adding unit 9 carries out a process of adding the local decoded prediction difference signal calculated by the inverse quantization/inverse transformation unit 8 and the intra prediction image generated by the intra prediction unit 4 or the inter prediction image generated by the motion-compensated prediction unit 5 to calculate a local decoded image corresponding to the target block to be encoded outputted from the block dividing unit 1.

The memory 10 for intra prediction is a recording medium for storing the local decoded image calculated by the adding unit 9. A loop filter unit 11 carries out a process of carrying out a predetermined filtering process on the local decoded image calculated by the adding unit 9 to output the local decoded image on which the filtering process is performed.

The motion-compensated prediction frame memory 12 is a recording medium for storing the local decoded image on which the filtering process is performed.

The variable length encoding unit 13 carries out a process of variable-length-encoding the compressed data outputted from the transformation/quantization unit 7, the output signal of the encoding controlling unit 2 (including the encoding mode, the intra prediction parameter or the inter prediction parameter, and the prediction difference encoding parameter), and the motion vector outputted from the motion-compensated prediction unit 5 (when the encoding mode is an inter encoding mode) to generate a bitstream. When the encoding mode is an intra encoding mode, the variable length encoding unit 13 determines a prediction direction vector whose direction is the closest to that of the prediction direction vector shown by the intra prediction parameter of the target block to be encoded determined by the encoding controlling unit 2 from among prediction direction vectors associated with a plurality of directional predictions in the intra prediction process to variable-length-encode an index indicating the specified prediction direction representative vector and also variable-length-encode an index indicating the difference between the prediction direction vector shown by the intra prediction parameter of an already-encoded block and the prediction direction representative vector as the variable length encoding of the intra prediction parameter determined by the encoding controlling unit 2. The variable length encoding unit 13 constructs a variable length encoding unit.

Figure 3:
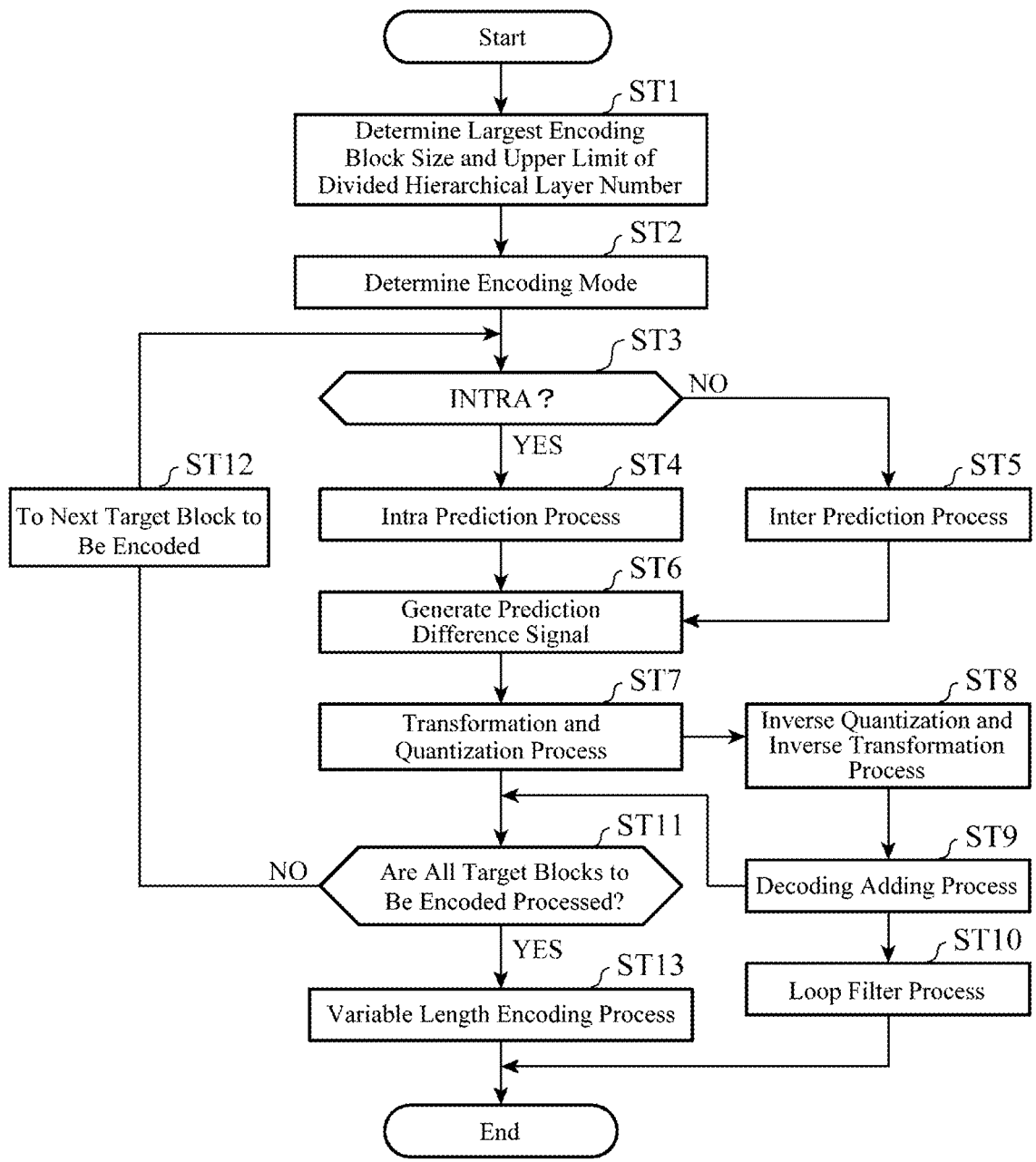
FIG. 3 is a flow chart showing a process (moving image coding method) carried out by the moving image encoding device in accordance with Embodiment 1 of the present invention.

In the example of FIG. 1, the block dividing unit 1, the encoding controlling unit 2, the select switch 3, the intra prediction unit 4, the motion-compensated prediction unit 5, the subtraction unit 6, the transformation/quantization unit 7, the inverse quantization/inverse transformation unit 8, the adding unit 9, the memory 10 for intra prediction, the loop filter unit 11, the motion-compensated prediction frame memory 12, and the variable length encoding unit 13, which are the components of the moving image encoding device, can consist of pieces of hardware for exclusive use (e.g., integrated circuits in each of which a CPU is mounted, one chip microcomputers, or the like), respectively. As an alternative, the moving image encoding device can consist of a computer, and a program in which the processes carried out by the block dividing unit 1, the encoding controlling unit 2, the select switch 3, the intra prediction unit 4, the motion-compensated prediction unit 5, the subtraction unit 6, the transformation/quantization unit 7, the inverse quantization/inverse transformation unit 8, the adding unit 9, the loop filter unit 11, and the variable length encoding unit 13 are described can be stored in a memory of the computer and the CPU of the computer can be made to execute the program stored in the memory. FIG. 3 is a flow chart showing the processing (moving image coding method) carried out by the moving image encoding device in accordance with Embodiment 1 of the present invention.

Figure 2:
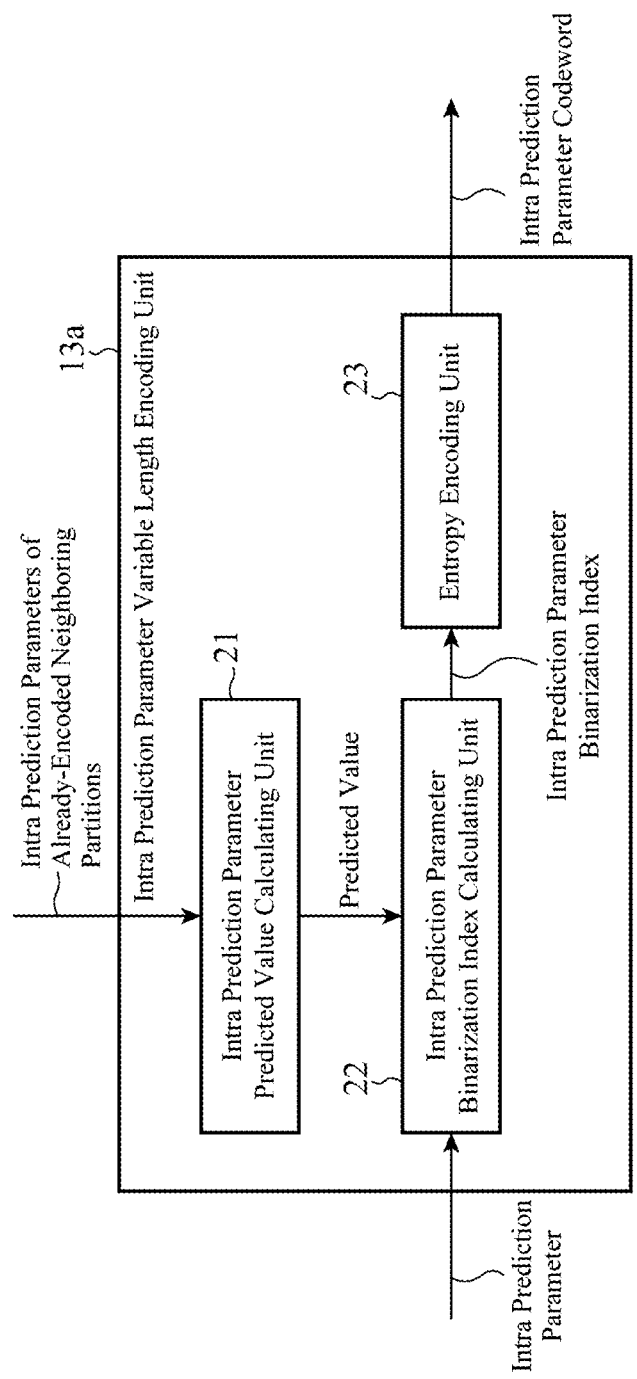
FIG. 2 is a block diagram showing the internal structure of a variable length encoding unit 13 of the moving image encoding device in accordance with Embodiment 1 of the present invention.

FIG. 2 is a block diagram showing the internal structure of the variable length encoding unit 13 of the moving image encoding device in accordance with Embodiment 1 of the present invention. The variable length encoding unit 13 has an intra prediction parameter variable length encoding unit 13a as one of its components. An intra prediction parameter predicted value calculating unit 21 of the intra prediction parameter variable length encoding unit 13a carries out a process of calculating a predicted value of the intra prediction parameter of the target block to be encoded which is outputted from the block dividing unit 1 from the intra prediction parameter of an already-encoded block adjacent to the target block to be encoded.

An intra prediction parameter binarization index calculating unit 22 carries out a process of determining whether the predicted value calculated by the intra prediction parameter predicted value calculating unit 21 matches the index indicating the prediction direction representative vector from both the predicted value calculated and the intra prediction parameter of the target block to be encoded, and, when the predicted value matches the index, calculating an intra prediction parameter binarization index including the difference between the prediction direction vector shown by the intra prediction parameter of the already-encoded block and the prediction direction representative vector as well as a flag showing the result of the determination, and, when the predicted value does not match the index, calculating an intra prediction parameter binarization index including the index indicating the prediction direction representative vector and the above-mentioned difference as well as the flag showing the result of the determination. An entropy encoding unit 23 carries out a process of carrying out variable length encoding, such as arithmetic encoding, on the intra prediction parameter binarization index calculated by the intra prediction parameter binarization index calculating unit 22 to output an intra prediction parameter codeword.

Figure 10:
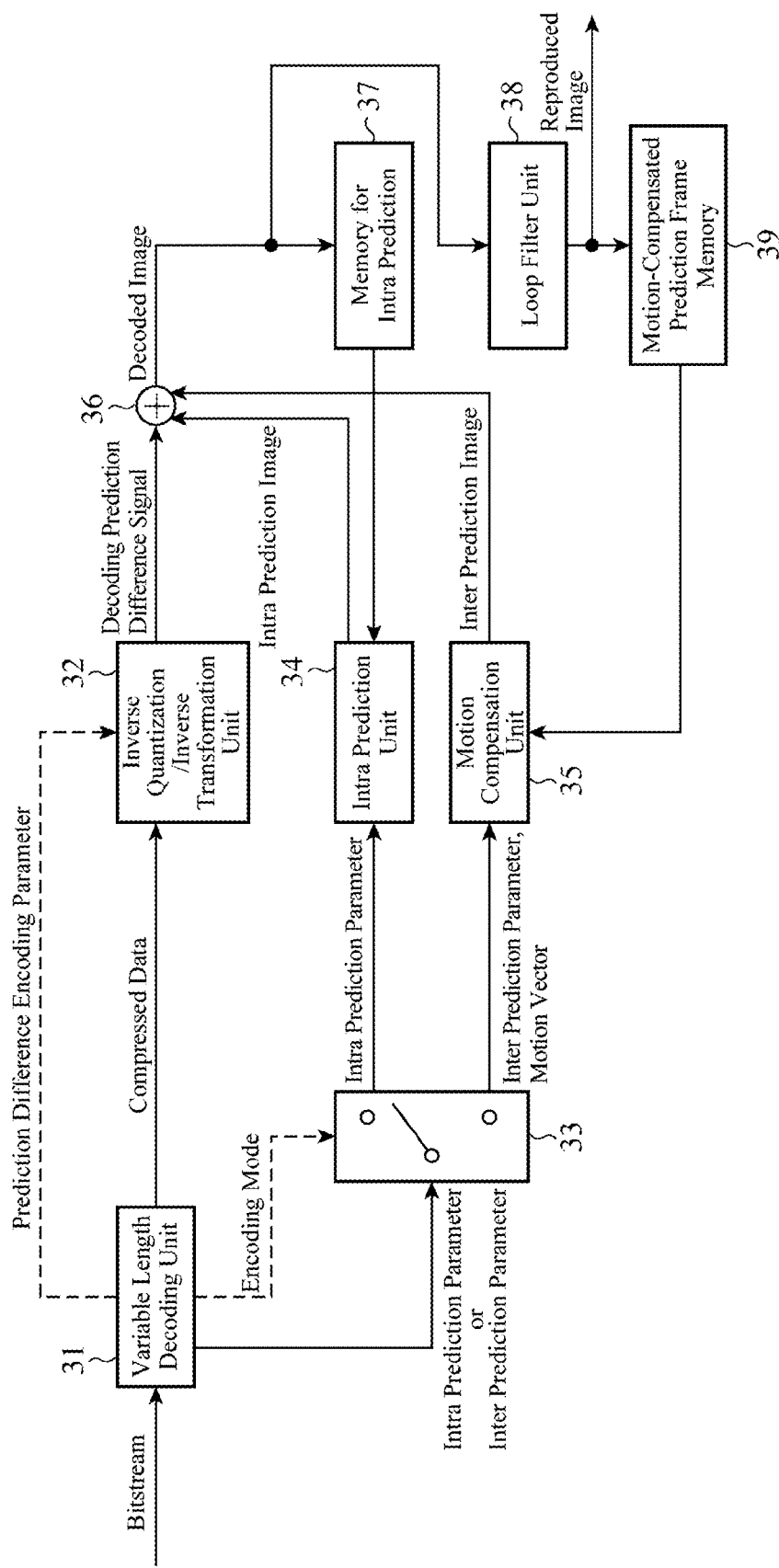
FIG. 10 is a block diagram showing a moving image decoding device in accordance with Embodiment 1 of the present invention.

FIG. 10 is a block diagram showing a moving image decoding device in accordance with Embodiment 1 of the present invention. Referring to FIG. 10, a variable length decoding unit 31 carries out a process of, when receiving the bitstream generated by the moving image encoding device, variable-length-decoding the compressed data, the encoding mode, the intra prediction parameter (when the encoding mode is an intra encoding mode), the inter prediction parameter (when the encoding mode is an inter encoding mode), the prediction difference encoding parameter, and the motion vector (when the encoding mode is an inter encoding mode) from the bitstream. When the encoding mode is an intra encoding mode, the variable length decoding unit 31 carries out a process of variable-length-decoding the index indicating the prediction direction representative vector and also variable-length-decoding the index indicating the difference between the prediction direction vector shown by the intra prediction parameter of an already-decoded block (a block corresponding to "the already-encoded block" in the moving image encoding device shown in FIG. 1), and the prediction direction representative vector as the variable length decoding of the intra prediction parameter to determine the intra prediction parameter from both the index indicating the prediction direction representative vector and the index indicating the above-mentioned difference. The variable length decoding unit 31 constructs a variable length decoding unit.

An inverse quantization/inverse transformation unit 32 carries out a process of inverse-quantizing the compressed data variable-length-decoded by the variable length decoding unit 31 by referring to the prediction difference encoding parameter variable-length-decoded by the variable length decoding unit 31, and also carrying out an inverse orthogonal transformation process on the transform coefficients which are the compressed data inverse-quantized thereby by referring to the prediction difference encoding parameter to calculate a decoded prediction difference signal corresponding to the prediction difference signal outputted from the subtraction unit 6 shown in FIG. 1. The inverse quantization/inverse transformation unit 32 constructs an inverse quantizing unit.

A select switch 33 carries out a process of, when the encoding mode variable-length-decoded by the variable length decoding unit 31 is an intra encoding mode, outputting the intra prediction parameter variable-length-decoded by the variable length decoding unit 31 to an intra prediction unit 34, and, when the encoding mode variable-length-decoded by the variable length decoding unit 31 is an inter encoding mode, outputting the inter prediction parameter and the motion vector which are variable-length-decoded by the variable length decoding unit 31 to a motion compensation unit 35.

The intra prediction unit 34 carries out a process of carrying out an intra prediction process on the target block to be decoded by using the intra prediction parameter outputted from the select switch 33 while referring to the decoded image stored in a memory 37 for intra prediction to generate an intra prediction image (prediction image). A prediction image generating unit is comprised of the select switch 33, the intra prediction unit 34, and the memory 37 for intra prediction.

The motion compensation unit 35 carries out a process of carrying out an inter prediction process (motion-compensated prediction process) on the target block to be decoded by using the motion vector and the inter prediction parameter which are outputted from the select switch 33 while referring to the decoded image on which a filtering process is performed and which is stored in a motion-compensated prediction frame memory 39 to generate an inter prediction image. An adding unit 36 carries out a process of adding the decoded prediction difference signal calculated by the inverse quantization/inverse transformation unit 32 and the intra prediction image generated by the intra prediction unit 34 or the inter prediction image generated by the motion compensation unit 35 to calculate a decoded image corresponding to the target block to be encoded outputted from the block dividing unit 1 shown in FIG. 1.

The memory 37 for intra prediction is a recording medium for storing the decoded image calculated by the adding unit 36. A loop filter unit 38 carries out a process of carrying out a predetermined filtering process on the decoded image calculated by the adding unit 36 to output the decoded image on which the filtering process is performed. The motion-compensated prediction frame memory 39 is a recording medium for storing the decoded image on which the filtering process is performed.

Figure 12:
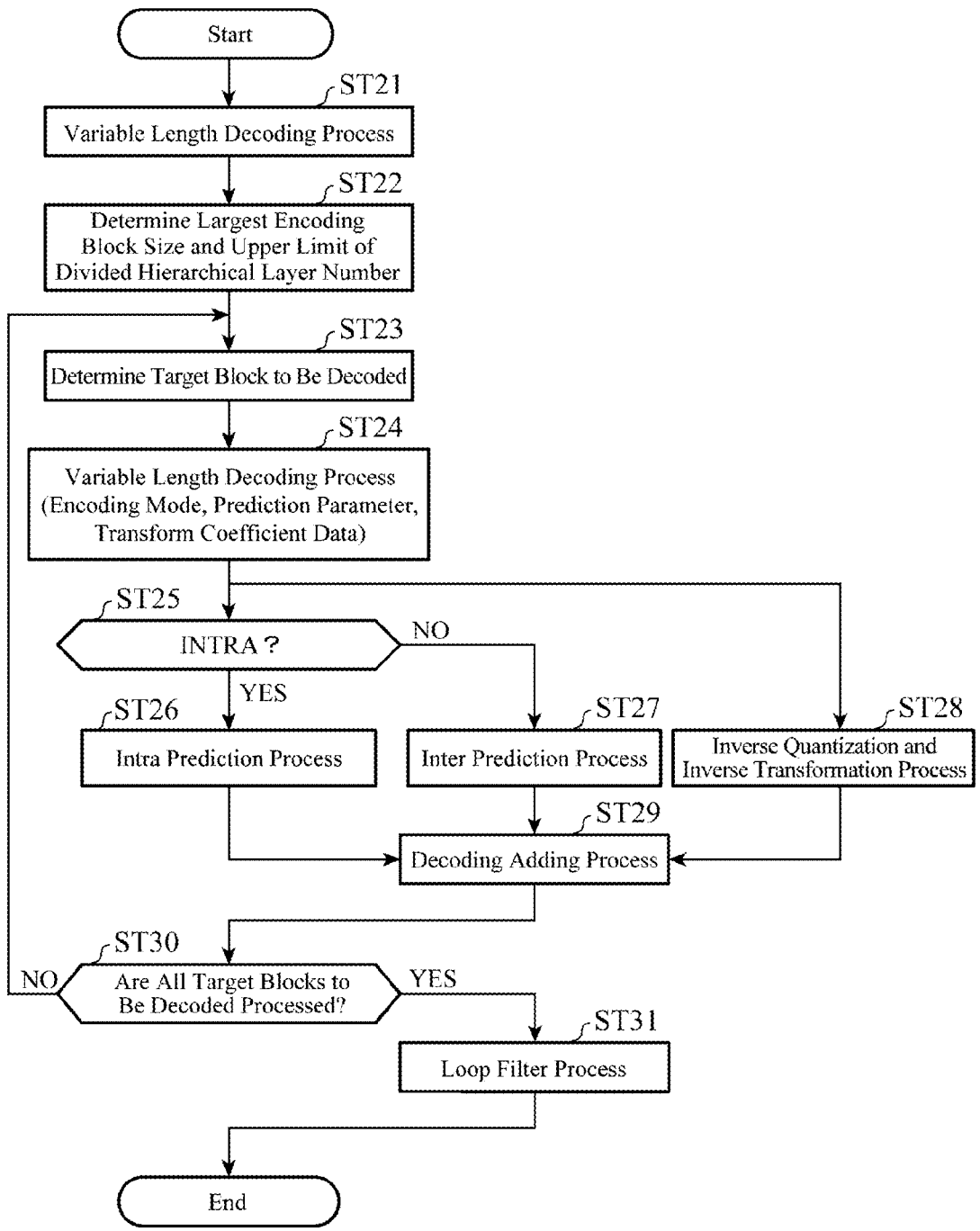
FIG. 12 is a flow chart showing a process (moving image decoding method) carried out by the moving image decoding device in accordance with Embodiment 1 of the present invention.

In the example of FIG. 10, the variable length decoding unit 31, the inverse quantization/inverse transformation unit 32, the select switch 33, the intra prediction unit 34, the motion compensation unit 35, the adding unit 36, the memory 37 for intra prediction, the loop filter unit 38, and the motion-compensated prediction frame memory 39, which are the components of the moving image decoding device, can consist of pieces of hardware for exclusive use (e.g., integrated circuits in each of which a CPU is mounted, one chip microcomputers, or the like), respectively. As an alternative, the moving image decoding device can consist of a computer, and a program in which the processes carried out by the variable length decoding unit 31, the inverse quantization/inverse transformation unit 32, the select switch 33, the intra prediction unit 34, the motion compensation unit 35, the adding unit 36, and the loop filter unit 38 are described can be stored in a memory of the computer and the CPU of the computer can be made to execute the program stored in the memory. FIG. 12 is a flow chart showing the processing (moving image decoding method) carried out by the moving image decoding device in accordance with Embodiment 1 of the present invention.

Figure 11:
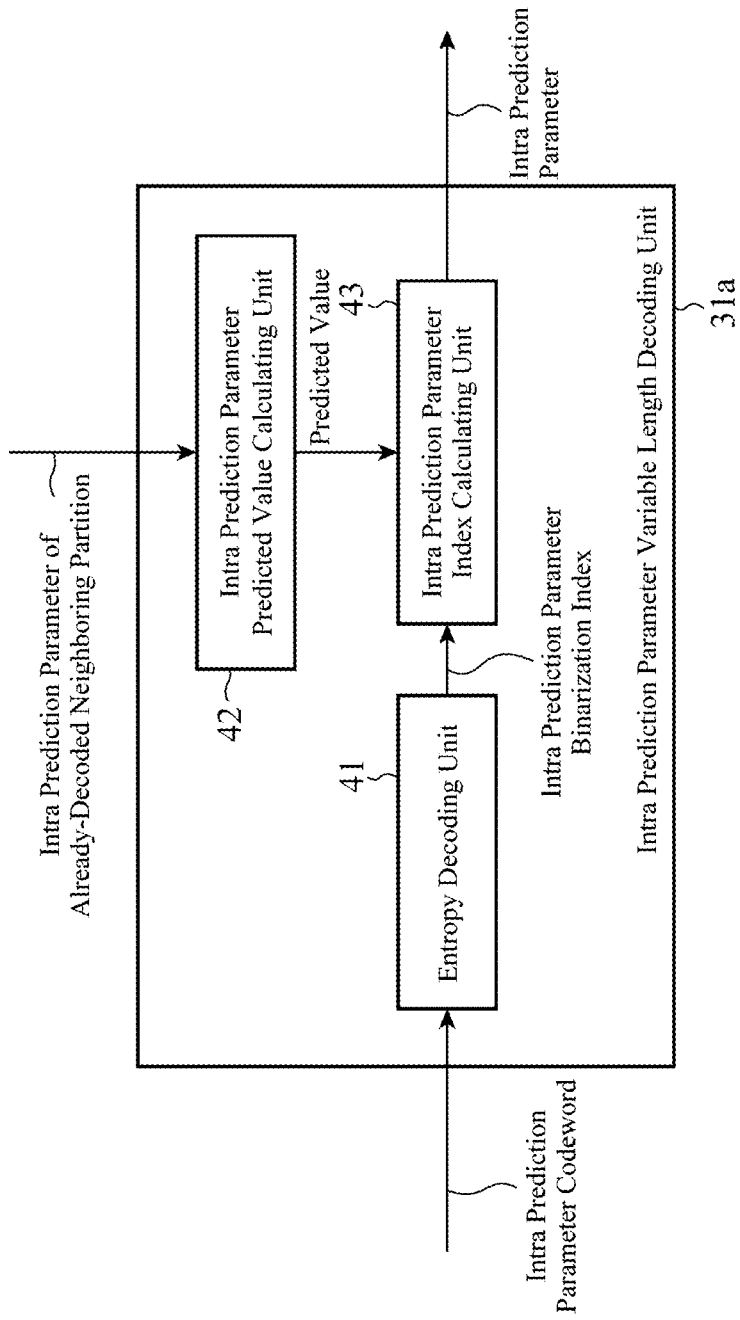
FIG. 11 is a block diagram showing the internal structure of a variable length decoding unit 31 of the moving image decoding device in accordance with Embodiment 1 of the present invention.

FIG. 11 is a block diagram showing the internal structure of the variable length decoding unit 31 of the moving image decoding device in accordance with Embodiment 1 of the present invention. The variable length decoding unit 31 has an intra prediction parameter variable length decoding unit 31a therein as one of its components. An entropy decoding unit 41 of the intra prediction parameter variable length decoding unit 31a carries out a process of variable-length-decoding the intra prediction parameter binarization index from the intra prediction parameter codeword. An intra prediction parameter predicted value calculating unit 42 carries out a process of calculating a predicted value of the intra prediction parameter of the target block to be decoded from the intra prediction parameter of an already-decoded block adjacent to the target block to be decoded.

An intra prediction parameter index calculating unit 43 carries out a process of, when the flag included in the intra prediction parameter binarization index variable-length-decoded by the entropy decoding unit 41 shows that the predicted value matches the index indicating the prediction direction representative vector, calculating an intra prediction parameter from the predicted value calculated by the intra prediction parameter predicted value calculating unit 42 and the difference value between the prediction direction vector shown by the intra prediction parameter of the already-decoded block included in the intra prediction parameter binarization index, and the prediction direction representative vector, and, when the flag shows that the predicted value does not match the index indicating the prediction direction representative vector, calculating an intra prediction parameter from the predicted value calculated by the intra prediction parameter predicted value calculating unit 42, the index indicating the prediction direction representative vector included in the intra prediction parameter binarization index, and the above-mentioned difference value.

Next, the operations of the moving image encoding device and the moving image decoding device will be explained. In this Embodiment 1, a case in which the moving image encoding device receives each frame image of a video as an inputted image, carries out a motion-compensated prediction between adjacent frames, and performs a compression process with an orthogonal transform and quantization on an acquired prediction difference signal, and, after that, carries out variable length encoding to generate a bitstream, and the moving image decoding device decodes the bitstream outputted from the moving image encoding device will be explained.

The moving image encoding device shown in FIG. 1 is characterized in that the moving image encoding device is adapted for local changes of a video signal in a space direction and in a time direction, divides the video signal into blocks having various sizes, and carries out intra-frame and inter-frame adaptive encoding. In general, the video signal has a characteristic of its complexity locally varying in space and time. There can be a case in which a pattern having a uniform signal characteristic in a relatively large image area, such as a sky image or a wall image, or a pattern having a complicated texture pattern in a small image area, such as a person image or a picture including a fine texture, also coexists on a certain video frame from the viewpoint of space. Also from the viewpoint of time, a relatively large image area, such as a sky image or a wall image, has a small local change in a time direction in its pattern, while an image of a moving person or object has a larger temporal change because its outline has a movement of a rigid body and a movement of a non-rigid body with respect to time.

Although in the encoding process a process of generating a prediction difference signal having small signal power and small entropy by using temporal and spatial prediction, thereby reducing the whole code amount, is carried out, the code amount of a parameter used for the prediction can be reduced as long as the parameter can be applied uniformly to as large an image signal region as possible. On the other hand, because the amount of errors occurring in the prediction increases when the same prediction parameter is applied to a large image area in an image signal pattern having a large change in time and space, the code amount of the prediction difference signal increases. Therefore, it is desirable to apply the same prediction parameter to an image area having a large change in time and space to reduce the block size of a block which is subjected to the prediction process, thereby increasing the data volume of the parameter which is used for the prediction and reducing the electric power and entropy of the prediction difference signal.

In this Embodiment 1, a structure of, in order to carry out encoding which is adapted for such the typical characteristics of a video signal, starting the prediction process and so on from a predetermined maximum block size first, hierarchically dividing the region of the video signal into blocks, and adapting the prediction process and the encoding process of encoding the prediction difference to each of the divided blocks is provided.

A video signal having a format which is to be processed by the moving image encoding device of FIG. 1 can be a YUV signal which consists of a luminance signal and two color difference signals or a color video image signal in arbitrary color space, such as an RGB signal, outputted from a digital image sensor, a monochrome image signal or an infrared image signal, or an arbitrary video signal in which each video frame consists of a series of digital samples (pixels) in two dimensions, horizontal and vertical. The gradation of each pixel can be an 8-bit, 10-bit, or 12-bit one.

In the following explanation, for convenience' sake, the video signal of the inputted image is a YUV signal unless otherwise specified. Further, a case in which signals having a 4:2:0 format which are subsampled are handled as the two color difference components U and V with respect to the luminance component Y will be described. Further, a data unit to be processed which corresponds to each frame of the video signal is referred to as a "picture." In this Embodiment 1, although a "picture" is explained as a video frame signal on which progressive scanning is carried out, a "picture" can be alternatively a field image signal which is a unit which constructs a video frame when the video signal is an interlaced signal.

First, the processing carried out by the moving image encoding device shown in FIG. 1 will be explained. First, the encoding controlling unit 2 determines the size of the largest blocks to be encoded which is used for the encoding of a picture (current picture) which is the target to be encoded, and an upper limit on the number of hierarchical layers into which each largest block to be encoded is divided (step ST1 of FIG. 3). As a method of determining the largest encoding block size of the largest blocks to be encoded, for example, there are a method of determining the same size for all the pictures according to the resolution of the video signal of the inputted image, and a method of quantifying a variation in the complexity of a local movement of the video signal of the inputted image as a parameter and then determining a small size for a picture having a large and vigorous movement while determining a large size for a picture having a small movement. As a method of determining the upper limit on the divided hierarchical layer number, for example, there is a method of increasing the depth of the hierarchy, i.e., the number of hierarchical layers to make it possible to detect a finer movement when the video signal of the inputted image has a large and vigorous movement, or decreasing the depth of the hierarchy, i.e., the number of hierarchical layers when the video signal of the inputted image has a small movement.

When receiving the video signal of the inputted image, the block dividing unit 1 divides the inputted image into pictures with the largest encoding block size and outputs each of the pictures into which the inputted image is divided. Further, the encoding controlling unit 2 hierarchically divides each of the image areas of the largest encoding block size into target blocks to be encoded each of which has an encoding block size until the number of hierarchical layers reaches the predetermined upper limit on the divided hierarchical layer number, and determines an encoding mode for each of the target blocks to be encoded (step ST2).

Figure 4:
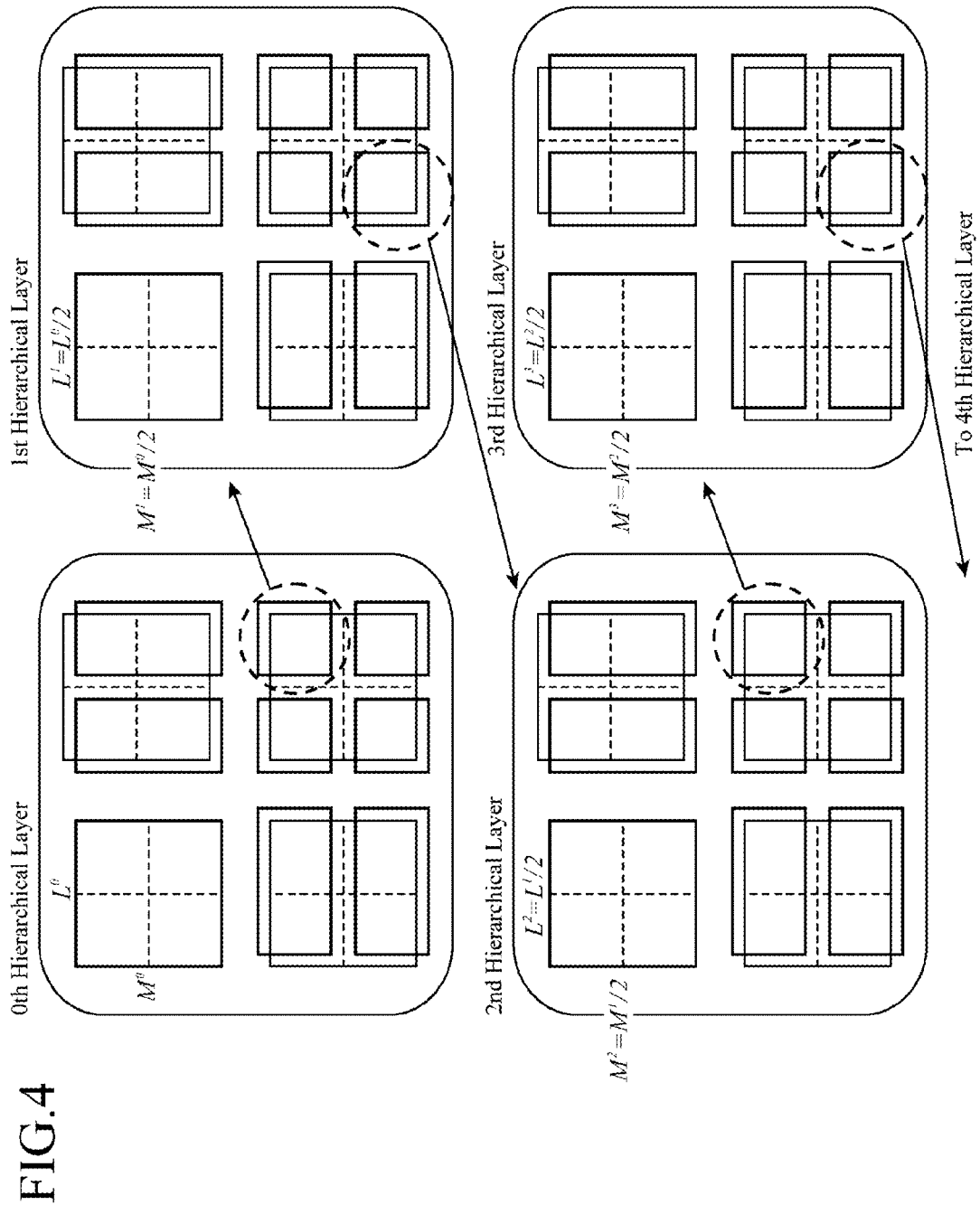
FIG. 4 is an explanatory drawing showing an example in which each largest block to be encoded is divided hierarchically into a plurality of target blocks to be encoded.

FIG. 4 is an explanatory drawing showing an example in which each largest block to be encoded is hierarchically divided into a plurality of target blocks to be encoded. Referring to FIG. 4, each largest block to be encoded is a target block to be encoded whose luminance component, which is shown by "0th hierarchical layer", has a size of ($L^0$, $M^0$). By carrying out the hierarchical division with this largest block to be encoded being set as a starting point until the depth of the hierarchy reaches a predetermined depth which is set separately according to a quadtree structure, the target blocks to be encoded can be acquired. At the depth of n, each target block to be encoded is an image area of size ($L^n$, $M^n$). In this example, although $M^n$ can be the same as or differ from $L^n$, the case of $L^n=M^n$ is shown in FIG. 4.

Hereafter, the encoding block size determined by the encoding controlling unit 2 is defined as the size of ($L^n$, $M^n$) in the luminance component of each target block to be encoded. In order to carry out a quadtree division, ($L^{n+1}$, $M^{n+1}$)=($L^n/2$, $M^n/2$) is always established. In the case of a color video image signal (4:4:4 format) in which all the color components have the same sample number, such as an RGB signal, all the color components have a size of ($L^n$, $M^n$), while in the case of handling a 4:2:0 format, a corresponding color difference component has an encoding block size of ($L^n/2$, $M^n/2$).

Hereafter, each target block to be encoded in the nth hierarchical layer is expressed as $B^n$, and an encoding mode selectable for each target block to be encoded $B^n$ is expressed as $m(B^n)$. In the case of a color video signal which consists of a plurality of color components, the encoding mode $m(B^n)$ can be formed in such a way that an individual mode is used for each color component, or can be formed in such a way that a common mode is used for all the color components. Hereafter, an explanation will be made by assuming that the encoding mode indicates the one for the luminance component of a block to be encoded having a 4:2:0 format in a YUV signal unless otherwise specified.

The encoding mode $m(B^n)$ can be one of one or more intra encoding modes (generically referred to as "INTRA") and one or more inter encoding modes (generically referred to as "INTER"), and the encoding controlling unit 2 selects, as the encoding mode $m(B^n)$, an encoding mode with the highest encoding efficiency for each target block to be encoded $B^n$ from among all the encoding modes available in the picture currently being processed or a subset of these encoding modes.

Each target block to be encoded $B^n$ is further divided into one or more prediction units (partitions) by the block dividing unit 1, as shown in FIG. 4. Hereafter, each partition belonging to a target block to be encoded $B^n$ is expressed as $P_i^n$ (i shows a partition number in the nth hierarchical layer). How the partition division on each target block to be encoded $B^n$ is carried out is included as information in the encoding mode $m(B^n)$. While the prediction process is carried out on each of all the partitions $P_i^n$ according to the encoding mode $m(B^n)$, an individual prediction parameter can be selected for each partition $P_i^n$.

Figure 5:
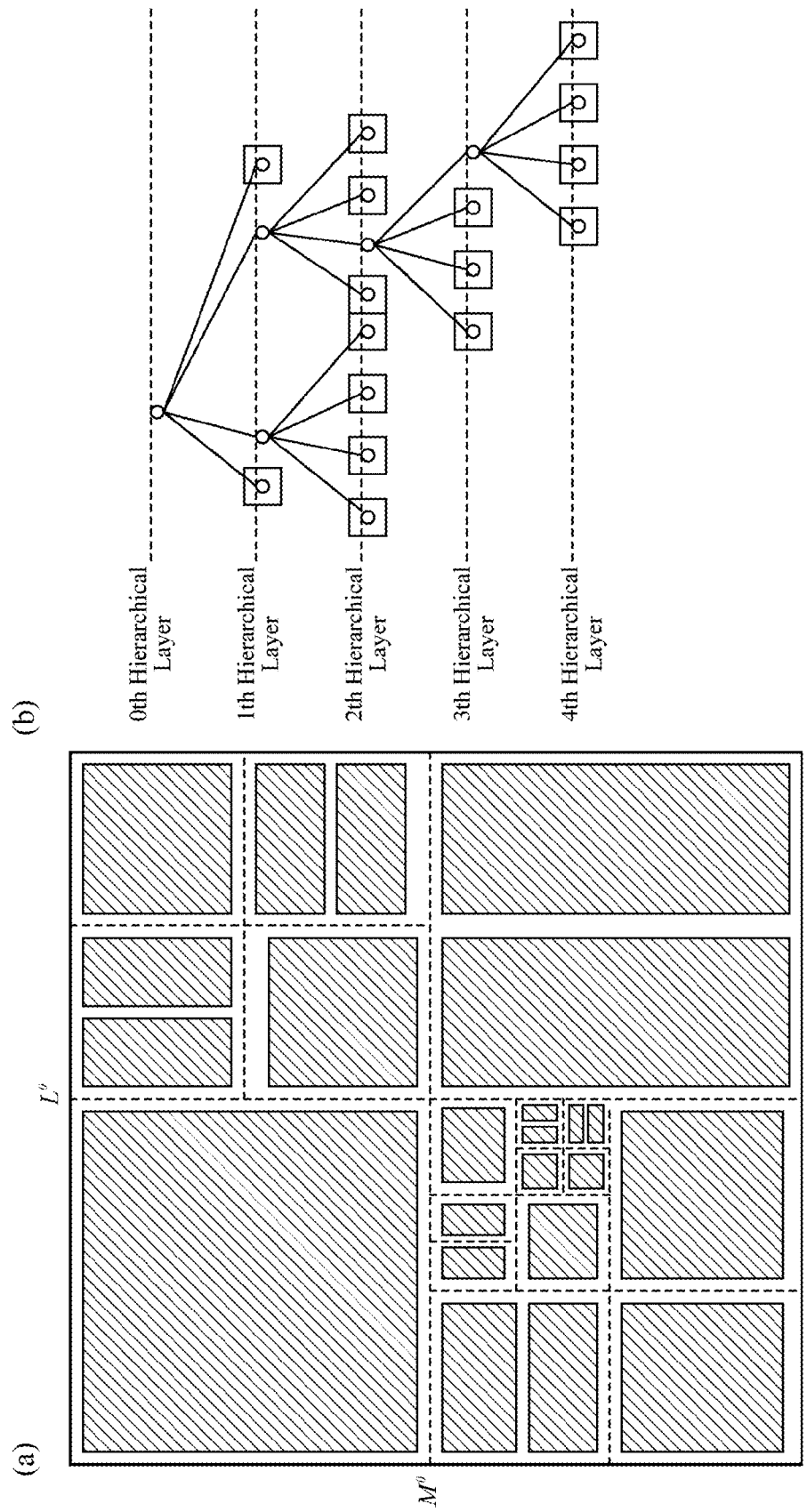
FIG. 5 is an explanatory drawing in which (a) shows a distribution of partitions divided, and (b) shows a state in which an encoding mode m(B$^n$) is assigned to each partition through the hierarchical division.

The encoding controlling unit 2 generates such a block division state as shown in FIG. 5 for each largest block to be encoded, and then determines target blocks to be encoded. Hatched portions shown in FIG. 5(a) show a distribution of partitions into which each largest block to be encoded is divided, and FIG. 5(b) shows a situation in which encoding modes $m(B^n)$ are respectively assigned to the partitions according to the hierarchical layer division by using a quadtree graph. Each node enclosed by □□shown in FIG. 5(b) is a node (target block to be encoded) to which an encoding mode $m(B^n)$ is assigned. The hierarchical layer division and encoding mode determination process in the encoding controlling unit 2 will be mentioned below in detail.

When the encoding mode $m(B^n)$ determined by the encoding controlling unit 2 is an intra encoding mode (in the case of $m(B^n) \in$ INTRA), the select switch 3 outputs the target block to be encoded $B^n$ outputted from the block dividing unit 1 to the intra prediction unit 4. In contrast, when the encoding mode $m(B^n)$ determined by the encoding controlling unit 2 is an inter encoding mode (in the case of $m(B^n) \in$ INTER), the select switch outputs the target block to be encoded $B^n$ outputted from the block dividing unit 1 to the motion-compensated prediction unit 5.

When the encoding mode $m(B^n)$ determined by the encoding controlling unit 2 is an intra encoding mode (in the case of $m(B^n) \in$ INTRA), and the intra prediction unit 4 receives the target block to be encoded $B^n$ from the select switch 3 (step ST3), the intra prediction unit 4 carries out the intra prediction process on each partition $P_i^n$ in the target block to be encoded $B^n$ by using the intra prediction parameter determined by the encoding controlling unit 2 while referring to the local decoded image stored in the memory 10 for intra prediction to generate an intra prediction image $P_{INTRAi}^n$ (step ST4). Because the image decoding device needs to generate an intra prediction image which is completely the same as the intra prediction image $P_{INTRAi}^n$ the intra prediction parameter used for the generation of the intra prediction image $P_{INTRAi}^n$ is outputted from the encoding controlling unit 2 to the variable length encoding unit 13 and is multiplexed into the bitstream. The details of the processing carried out by the intra prediction unit 4 will be mentioned below.

When the encoding mode $m(B^n)$ determined by the encoding controlling unit 2 is an inter encoding mode (in the case of $m(B^n) \in$ INTER), and the motion-compensated prediction unit 5 receives the target block to be encoded $B^n$ from the select switch 3 (step ST3), the motion-compensated prediction unit 5 compares each partition $P_i^n$ in the target block to be encoded $B^n$ with the local decoded image on which the filtering process is performed and which is stored in the motion-compensated prediction frame memory 12 to search for a motion vector, and carries out the inter prediction process on each partition $P_i^n$ in the target block to be encoded $B^n$ by using both the motion vector and the inter prediction parameter determined by the encoding controlling unit 2 to generate an inter prediction image $P_{INTERi}^n$ (step ST5). Because the image decoding device needs to generate an inter prediction image which is completely the same as the inter prediction image $P_{INTERi}^n$, the inter prediction parameter used for the generation of the inter prediction image $P_{INTERi}^n$ is outputted from the encoding controlling unit 2 to the variable length encoding unit 13 and is multiplexed into the bitstream. The motion vector which is searched for by the motion-compensated prediction unit 5 is also outputted to the variable length encoding unit 13 and is multiplexed into the bitstream.

When receiving the target block to be encoded $B^n$ from the block dividing unit 1, the subtraction unit 6 subtracts the intra prediction image $P_{INTRAi}^n$ generated by the intra prediction unit 4 or the inter prediction image $P_{INTERi}^n$ generated by the motion-compensated prediction unit 5 from each partition $P_i^n$ in the target block to be encoded $B^n$, and outputs a prediction difference signal $e_i^n$ showing the result of the subtraction to the transformation/quantization unit 7 (step ST6).

When receiving the prediction difference signal $e_i^n$ from the subtraction unit 6, the transformation/quantization unit 7 carries out an orthogonal transformation process (e.g., a DCT (discrete cosine transform) or an orthogonal transformation process, such as a KL transform, in which bases are designed for a specific learning sequence in advance) on the prediction difference signal $e_i^n$ by referring to the prediction difference encoding parameter determined by the encoding controlling unit 2 to calculate transform coefficients. The transformation/quantization unit 7 also quantizes the transform coefficients by referring to the prediction difference encoding parameter and then outputs compressed data which are the transform coefficients quantized thereby to the inverse quantization/inverse transformation unit 8 and the variable length encoding unit 13 (step ST7).

When receiving the compressed data from the transformation/quantization unit 7, the inverse quantization/inverse transformation unit 8 inverse-quantizes the compressed data by referring to the prediction difference encoding parameter determined by the encoding controlling unit 2. The inverse quantization/inverse transformation unit 8 also carries out an inverse orthogonal transformation process (e.g., an inverse DCT or an inverse KL transform) on the transform coefficients which are the compressed data inverse-quantized thereby by referring to the prediction difference encoding parameter to calculate a local decoded prediction difference signal corresponding to the prediction difference signal $e_i^n$ outputted from the subtraction unit 6 (step ST8).

When receiving the local decoded prediction difference signal from the inverse quantization/inverse transformation unit 8, the adding unit 9 adds the local decoded prediction difference signal and the intra prediction image $P_{INTRAi}^n$ generated by the intra prediction unit 4 or the inter prediction image $P_{INTERi}^n$ generated by the motion-compensated prediction unit 5 to calculate a local decoded image corresponding to the target block to be encoded $B^n$ outputted from the block dividing unit 1 as a local decoded partition image or a collection of local decoded partition images (step ST9). The adding unit 9 outputs the local decoded image to the loop filter unit 11 while storing the local decoded image in the memory 10 for intra prediction. This local decoded image is the image signal for subsequent intra prediction.

When receiving the local decoded image from the adding unit 9, the loop filter unit 11 carries out the predetermined filtering process on the local decoded image, and stores the local decoded image on which the loop filter unit carries out the filtering process in the motion-compensated prediction frame memory 12 (step ST10). The filtering process by the loop filter unit 11 can be carried out on each largest block to be encoded of the local decoded image inputted or each block to be encoded of the local decoded image inputted. As an alternative, after the local decoded images of all the macroblocks of one screen is inputted, the filtering process can be carried out on all the local decoded images of the one screen at a time.

When the processes of steps ST3 to ST9 on all the target blocks to be encoded $B^n$ are completed (steps ST11 and ST12), the variable length encoding unit 13 variable-length-encodes the compressed data outputted from the transformation/quantization unit 7, the encoding mode $m(B^n)$ outputted from the encoding controlling unit 2, the intra prediction parameter (when the encoding mode is an intra encoding mode) or the inter prediction parameter (when the encoding mode is an inter encoding mode) outputted from the encoding controlling unit 2, and the motion vector outputted from the motion-compensated prediction unit 5 (when the encoding mode is an inter encoding mode) to generate a bitstream showing the encoded results of these data (step ST13). The details of the processing carried out by the variable length encoding unit 13 will be mentioned later.

Next, the processing carried out by the intra prediction unit 4 will be explained in detail. FIG. 6 is an explanatory drawing showing an example of the intra prediction parameter (intra prediction mode) which can be selected for each partition $P_i^n$ in the target block to be encoded $B^n$. In FIG. 6, intra prediction modes and prediction direction vectors represented by each of the intra prediction modes are shown. In the example of FIG. 6, it is designed that a relative angle between prediction direction vectors becomes small with increase in the number of selectable intra prediction modes.

The intra prediction unit 4 carries out the intra prediction process on each partition $P_i^n$ by referring to the intra prediction parameter of the partition $P_i^n$ to generate an intra prediction image $P_{INTRAi}^n$, as mentioned above. Hereafter, an intra process of generating an intra prediction signal of the luminance signal on the basis of the intra prediction parameter (intra prediction mode) for the luminance signal of one partition $P_i^n$ will be explained.

Figure 7:
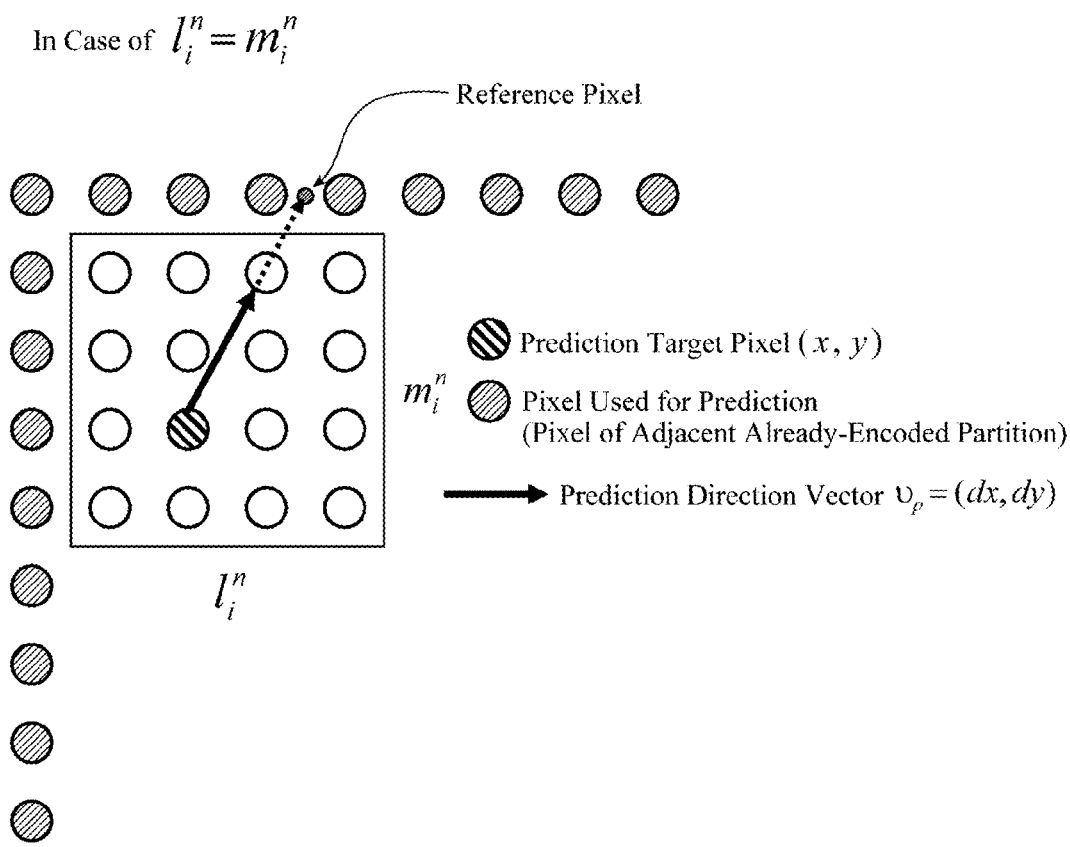
FIG. 7 is an explanatory drawing showing an example of pixels which are used when generating a predicted value of each pixel in a partition P$_i^n$ in the case of $l_i^n = m_i^n = 4$.

It is assumed that the size of the partition $P_i^n$ is $l_i^n \times m_i^n$ pixels. FIG. 7 is an explanatory drawing showing an example of pixels which are used when generating a predicted value of each pixel in the partition $P_i^n$ in the case of $l_i^n = m_i^n = 4$. Although the $(2 \times l_i^n + 1)$ pixels in the already-encoded upper partition which is adjacent to the partition $P_i^n$ and the $(2 \times m_i^n)$ pixels in the already-encoded left partition which is adjacent to the partition $P_i^n$ are defined as the pixels used for prediction in the example of FIG. 7, a smaller number of pixels than the pixels shown in FIG. 7 can be used for prediction. Although one row or column of pixels which are adjacent to the partition $P_i^n$ are used for prediction in the example of FIG. 7, two rows or columns of pixels or three or more rows or columns of pixels can be used for prediction.

When the index value indicating the intra prediction mode for the partition $P_i^n$ is 2 (average prediction), the intra prediction unit generates a prediction image by using the average of the adjacent pixels in the upper partition and the adjacent pixels in the left partition as the predicted value of each pixel in the partition $P_i^n$. When the index value indicating the intra prediction mode is other than 2 (average prediction), the intra prediction unit generates the predicted value of each pixel in the partition $P_i^n$ on the basis of a prediction direction vector $u_p = (dx, dy)$ shown by the index value. When relative coordinates in the partition $P_i^n$ (the upper left pixel of the partition is defined as the point of origin) of each pixel (prediction target pixel) for which the predicted value is generated are expressed as (x, y), the position of a reference pixel which is used for prediction is the point of intersection where the following L and one of the lines of adjacent pixels intersect each other.

$$L = \begin{pmatrix} x \\ y \end{pmatrix} + k\upsilon_p$$

where k is a scalar value

When the reference pixel is at an integer pixel position, the value of the corresponding integer pixel is determined as the predicted value of the prediction target pixel, whereas when the reference pixel is not at an integer pixel position, the value of an interpolation pixel generated from the integer pixels which are adjacent to the reference pixel is determined as the predicted value of the prediction target pixel. In the example of FIG. 7, because the reference pixel is not at an integer pixel position, the average of the values of the two horizontal pixels which are adjacent to the reference pixel is determined as the predicted value of the prediction target pixel. The intra prediction unit can use not only the adjacent two pixels but also one or more adjacent pixels to generate an interpolation pixel and determine the value of this interpolation pixel as the predicted value. According to the same procedure, the intra prediction unit generates prediction pixels for all the pixels of the luminance signal in the partition $P_i^n$, and outputs an intra prediction image $P_{INTRAi}^n$. The intra prediction parameter used for the generation of the intra prediction image $P_{INTRAi}^n$ is outputted to the variable length encoding unit 13 in order to multiplex the intra prediction parameter into the bitstream.

The intra prediction unit also carries out an intra process based on the intra prediction parameter (intra prediction mode) on each of the color difference signals of the partition $P_i^n$ according to the same procedure as that according to which the intra prediction unit carries out the intra process on the luminance signal, and outputs the intra prediction parameter used for the generation of the intra prediction image to the variable length encoding unit 13.

Figure 8:
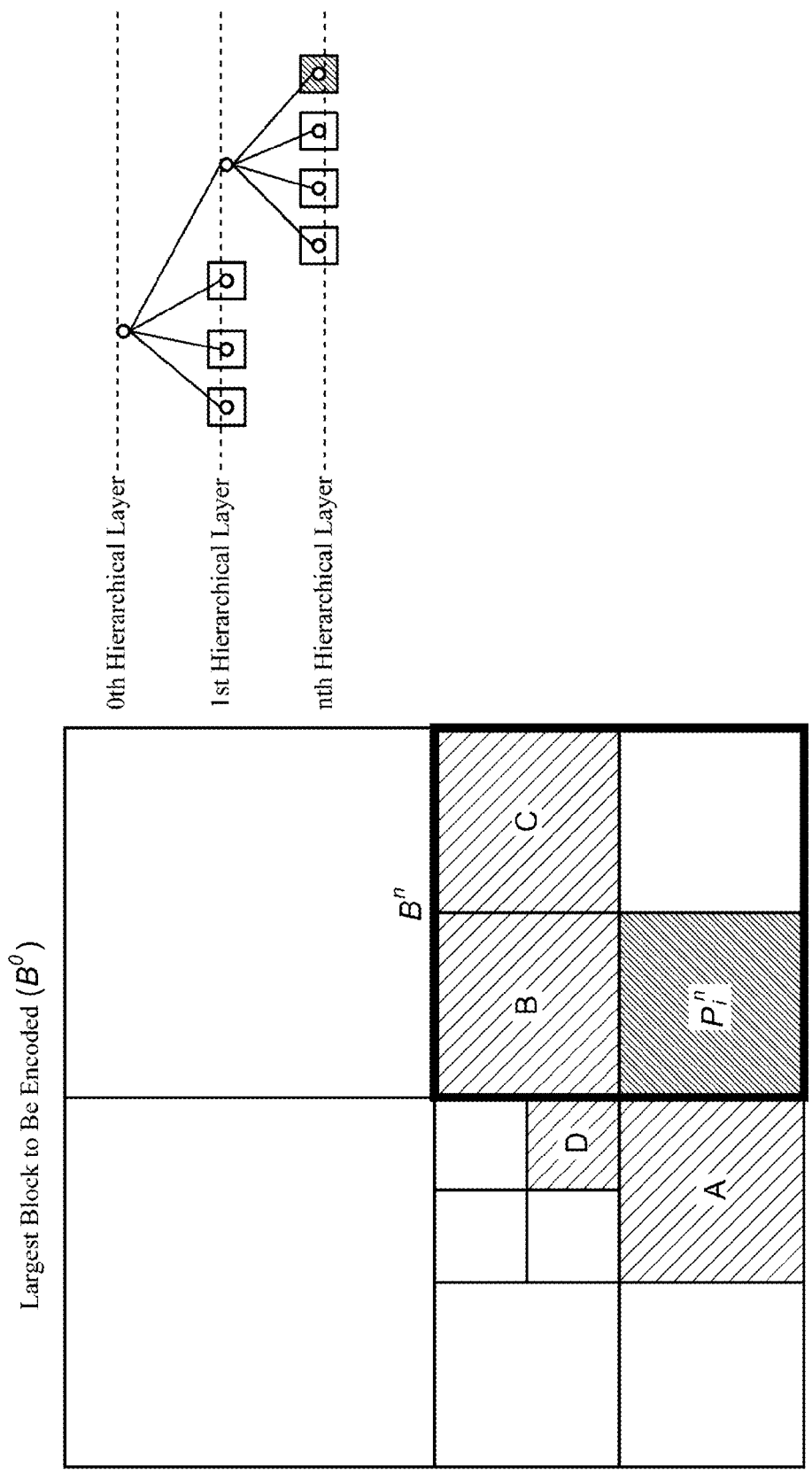
FIG. 8 is an explanatory drawing showing an example of already-encoded neighboring partitions which are used for calculation of a predicted value of an intra prediction parameter of a partition P$_i^n$.

Next, the processing carried out by the variable length encoding unit 13 will be explained in detail. When variable-length-encoding the intra prediction parameter, the variable length encoding unit 13 calculates a predicted value of the intra prediction parameter of the partition $P_i^n$ which is the target to be encoded on the basis of the intra prediction parameters of already-encoded partitions in the neighborhood of the partition $P_i^n$ and then carries out predictive encoding by using the predicted value. More specifically, the intra prediction parameter predicted value calculating unit 21 of the intra prediction parameter variable length encoding unit 13a which constructs a part of the variable length encoding unit 13 calculates the predicted value of the intra prediction parameter of the partition $P_i^n$ which is the target to be encoded on the basis of the intra prediction parameters of already-encoded neighboring partitions. FIG. 8 is an explanatory drawing showing an example of already-encoded neighboring partitions which are used for the calculation of the predicted value of the intra prediction parameter of the partition $P_i^n$. In the example of FIG. 8, the intra prediction parameters of the partitions on a left side (A), an upper side (B), an upper right side (C), and an upper left side (D) of the partition $P_i^n$ are used for the calculation of the predicted value.

Figure 9:
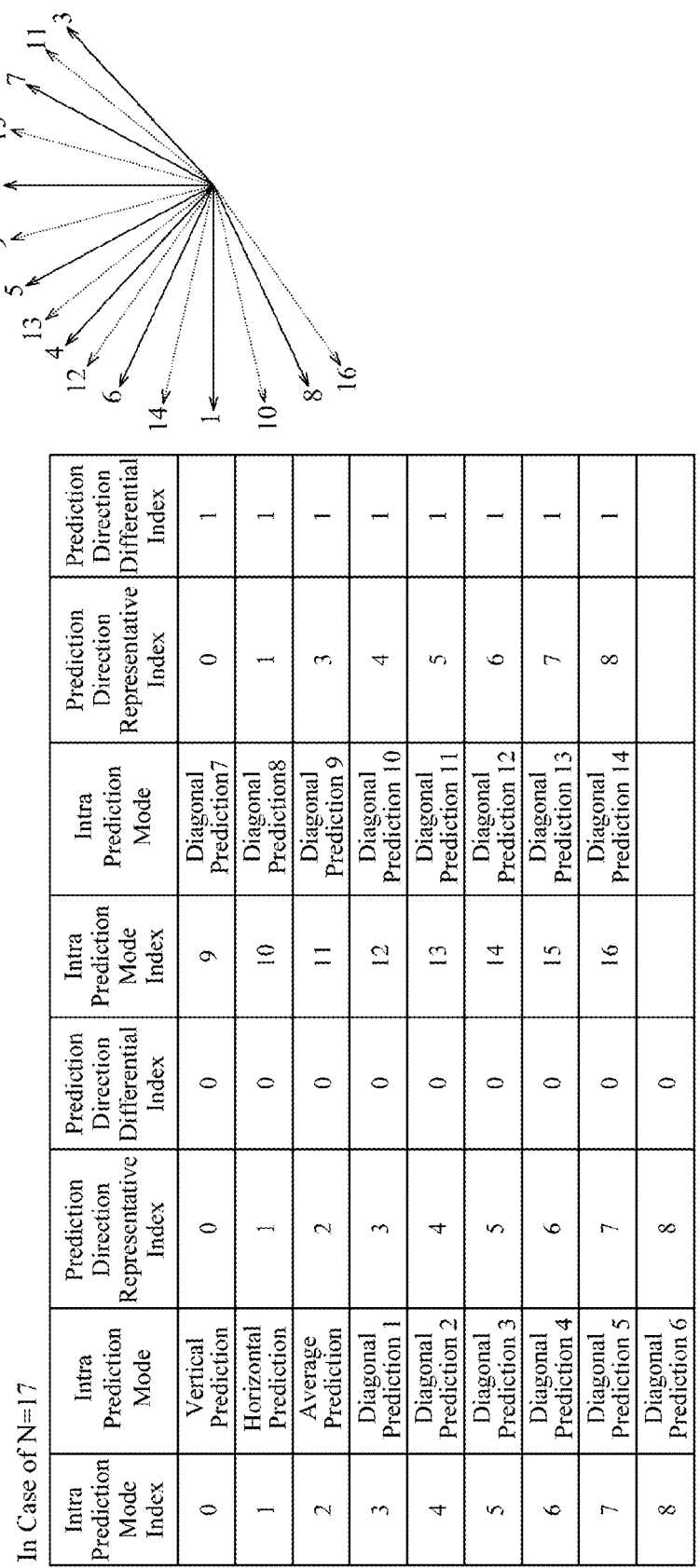
FIG. 9 is an explanatory drawing showing an example of index values respectively indicating 17 types of intra prediction modes, and prediction direction vectors of 16 types of directional prediction modes excluding an average prediction.

The process of calculating the predicted value which is carried out by the intra prediction parameter predicted value calculating unit 21 will be explained by taking a case in which 17 types of intra prediction modes as shown in FIG. 6 are provided as an example. In the example of FIG. 6, the 17 types of intra prediction modes consist of an average prediction mode and 16 types of directional prediction modes. FIG. 9 is an explanatory drawing showing an example of the index values respectively indicating the 17 types of intra prediction modes, and the prediction direction vectors of the 16 types of directional prediction modes excluding the average prediction. It is assumed that prediction direction representative vectors respectively showing representative directions are predetermined from among the 16 types of prediction direction vectors. The following explanation will be made by taking a case of predetermining the prediction direction vectors in nine directions "0" to "8" shown in FIG. 9 as the prediction direction representative vectors as an example.

The intra prediction parameter predicted value calculating unit 21 calculates a prediction direction representative index from the intra prediction modes of the already-encoded neighboring partitions which are used for the calculation of the predicted value. A prediction direction representative index indicating each directional prediction mode is an index indicating the prediction direction representative vector having the smallest relative angle with respect to the prediction direction vector shown by the directional prediction mode. More specifically, a prediction direction representative index indicating each directional prediction mode is an index value indicating the prediction direction representative vector whose direction is the closest to the prediction direction vector shown by the directional prediction mode. The prediction direction representative index of the average prediction mode is the index value indicating itself (i.e., the average prediction mode). FIG. 9 shows the prediction direction representative indexes indicating the 17 types of intra prediction modes, respectively. In addition, different prediction direction differential indexes are assigned to intra prediction mode indexes having the same prediction direction representative index.

Next, the process of calculating the predicted value of the intra prediction parameter of the partition $P_i^n$ which is the target to be encoded on the basis of the prediction direction representative indexes respectively indicating the intra prediction modes of the already-encoded neighboring partitions will be explained. For example, when the neighboring partitions used for the calculation of the predicted value are the ones on a left side (A), an upper side (B), an upper right side (C), and an upper left side (D) of the partition $P_i^n$, a statistic value which is predetermined from among statistic values including a mode, a minimum, and a median of $m_A$, $m_B$, $m_C$, and $m_D$ is determined as the predicted value $pm_p$, where the prediction direction representative indexes of the partitions A, B, C, and D are expressed as $m_A$, $m_B$, $m_C$, and $m_D$, respectively. As an alternative, the predicted value is determined dependently upon the direction of the prediction direction vector of a neighboring partition. For example, when the direction of the prediction direction vector of the partition C is a diagonal down-left one (when the intra prediction mode index is 8, 10, or 16 in the example of FIG. 9), the prediction direction representative index (8 in the example of FIG. 9) of the prediction direction representative vector whose direction is a diagonal down-left one is determined as the predicted value $pm_p$ of the partition $P_i^n$ because there is a high probability that the direction of the prediction direction vector of the partition $P_i^n$ is also a diagonal down-left one from the viewpoint of the continuity of the edge. As an alternative, the prediction direction representative index of one partition which is predetermined from among the partitions A, B, C, and D can be determined as the predicted value $pm_p$. As an alternative, instead of using the prediction direction representative indexes of the neighboring partitions, a predetermined prediction direction representative index (e.g., the index indicating the average prediction mode) can be determined as the predicted value $pm_p$. The calculated predicted value $pm_p$ is then outputted to the intra prediction parameter binarization index calculating unit 22.

The intra prediction parameter binarization index calculating unit 22 receives both the intra prediction parameter (index in intra prediction mode) $m_p$ of the partition $P_i^n$ which is the target to be encoded, and the predicted value $pm_p$, and calculates an intra prediction parameter binarization index $dm_p$. Hereafter, a method of calculating the intra prediction parameter binarization index will be explained.

The prediction direction representative index indicating the intra prediction mode $m_p$ is expressed as $rm_p$.

When $rm_P = pm_P$, $dm_P = 0$

When $rm_P \neq pm_P$, $$dm_P = (1 << n) | \tilde{r}m_P \begin{cases} \tilde{r}m_P = rm_P & (rm_P < pm_P) \\ \tilde{r}m_P = rm_P - 1 & (rm_P > pm_P) \end{cases}$$

$$n = \begin{cases} 1 & (m = 2) \\ \text{CEIL}(\log 2(m-1)) & (m > 2) \end{cases}$$

CEIL(x) is a function of rounding up x to the nearest integer where m is the number of prediction direction representative indexes, and m=9 and n=3 in the example of FIG. 9.

Next, the variable length encoding unit further carries out a process on the above-mentioned intra prediction parameter binarization index $dm_p$ according to an equation shown below in which the prediction direction differential index indicating the intra prediction mode $m_p$ is expressed as $dr_p$.

$dm_p = (dm_p << k) | dr_p$, $k$=CEIL(log 2(l))

where l is the number of intra prediction modes which have the same prediction direction representative index. In the example of FIG. 9, when the intra prediction mode is the average prediction, l=1 and k=0, and when the intra prediction mode is other than the average prediction, l=2 and k=1.

The first bit of the intra prediction parameter binarization index $dm_p$ which is determined by using the above-mentioned calculating method is a flag bit showing whether the prediction direction representative index $rm_p$ indicating the intra prediction mode matches the predicted value $pm_p$ (in the above-mentioned computation equation, when they match each other, "0" is provided as the flag bit; otherwise, i.e., when they don't match each other, "1" is provided as the flag bit). When the prediction direction representative index $rm_p$ indicating the intra prediction mode matches the predicted value $pm_p$, the 2nd to (k+1)th bits of the intra prediction parameter binarization index $dm_p$ show the prediction direction differential index value. In contrast, when the prediction direction representative index $rm_p$ indicating the intra prediction mode don't match the predicted value $pm_p$, the 2nd to (n+1)th bits of the intra prediction parameter binarization index $dm_p$ show the prediction direction representative index value and the (n+2)th to (n+k+1)th bits of the intra prediction parameter binarization index $dm_p$ show the prediction direction differential index value. The intra prediction parameter binarization index $dm_p$ calculated through the above-mentioned process is outputted to the entropy encoding unit 23.

The entropy encoding unit 23 carries out Huffman encoding, such as arithmetic encoding, on the intra prediction parameter binarization index $dm_p$ outputted from the intra prediction parameter binarization index calculating unit 22 for each prediction direction representative index $rm_p$ and for each prediction direction differential index while changing the context according to their respective probability models. An intra prediction parameter codeword which is the encoded result is multiplexed into the bitstream by a bitstream multiplexing unit (not shown) of the variable length encoding unit 13.

When encoding the intra prediction parameter, the variable length encoding unit 13 of the moving image encoding device shown in FIG. 1 selects a representative prediction direction vector (prediction direction representative vector) from among the prediction direction vectors of a plurality of directional predictions, expresses the intra prediction parameter by using the index indicating the prediction direction representative vector (prediction direction representative index) and the index indicating the difference between the prediction direction vector and the prediction direction representative vector (prediction direction differential index), and carries out Huffman encoding, such as arithmetic encoding, for each prediction direction representative index and for each prediction direction differential index according to their respective probability models. Therefore, the moving image encoding device can encode the intra prediction parameter with reduced code amount.

Next, the processing carried out by the moving image decoding device shown in FIG. 10 will be explained concretely. When receiving the bitstream generated by the moving image encoding device shown in FIG. 1, the variable length decoding unit 31 carries out a variable length decoding process on the bitstream (step ST21 of FIG. 12) and decodes information having a size of one or more frames on a per-sequence basis, each sequence consisting of one or more frames of pictures, or on a per-picture basis.

More specifically, the variable length decoding unit 31 determines the largest encoding block size and the upper limit on the divided hierarchical layer number which are determined by the encoding controlling unit 2 of the moving image encoding device shown in FIG. 1 according to the same procedure as that according to which the moving image encoding device does (step ST22). For example, when the largest encoding block size is determined according to the resolution of the video signal, the variable length decoding unit determines the largest encoding block size on the basis of the decoded frame size information and according to the same procedure as that according to which the moving image encoding device does. When the largest encoding block size and the upper limit on the divided hierarchical layer number are multiplexed into the bitstream by the moving image encoding device, the variable length decoding unit uses the values decoded from the bitstream. The moving image encoding device multiplexes both the encoding mode which the moving image encoding device sets for each of a plurality of target blocks to be encoded into which the moving image encoding device acquires by carrying out hierarchical division on each largest block to be encoded with this largest block to be encoded being set as a starting point, and the compressed data which the moving image encoding device acquires by carrying out the transform and quantization into the bitstream, as shown in FIG. 4. The variable length decoding unit 31 which receives this bitstream decodes the state of division of each determined largest block to be encoded which is included in the encoding mode. The variable length decoding unit hierarchically determines target blocks to be decoded (i.e., blocks corresponding to the "target blocks to be encoded" which are processed by the moving image encoding device shown in FIG. 1) on the basis of the decoded division state (step ST23).

The variable length decoding unit 31 then decodes the encoding mode assigned to each target block to be encoded. The variable length decoding unit divides the target block to be encoded into one or more prediction units on the basis of the information included in the decoded encoding mode, and decodes the prediction parameter assigned to each of the one or more prediction units (step ST24).

When the encoding mode assigned to the target block to be decoded (target block to be encoded) is an intra encoding mode, the variable length decoding unit 31 decodes the intra prediction parameter of each of the one or more partitions which are included in the target block to be decoded (target block to be encoded), and each of which is a prediction unit. When decoding the intra prediction parameter, the variable length decoding unit calculates a predicted value of the intra prediction parameter of the partition $P_i^n$ which is the target to be decoded according to the same procedure as that according to which the moving image encoding device does and on the basis of the intra prediction parameters of neighboring decoded partitions, and decodes the intra prediction parameter by using the predicted value.

More specifically, the entropy decoding unit 41 in the intra prediction parameter variable length decoding unit 31a which constructs a part of the variable length decoding unit 31 receives the intra prediction parameter codeword included in the bitstream and variable-length-decodes the intra prediction parameter binarization index from the intra prediction parameter codeword. The intra prediction parameter predicted value calculating unit 42 calculates the predicted value of the intra prediction parameter of the target block to be decoded from the intra prediction parameters of already-decoded blocks which are adjacent to the target block to be decoded according to the same procedure as that according to which the intra prediction parameter predicted value calculating unit 21 of the moving image encoding device does.

The intra prediction parameter index calculating unit 43 calculates the intra prediction parameter from both the intra prediction parameter binarization index variable-length-decoded by the entropy decoding unit 41 and the predicted value calculated by the intra prediction parameter predicted value calculating unit 42. Hereafter, a method of calculating the intra prediction parameter will be explained.

The intra prediction parameter index calculating unit 43 calculates a prediction direction representative index and a prediction direction differential index in order to calculate an intra prediction parameter index. The intra prediction parameter binarization index is expressed as $dm_p$. When the first bit of the intra prediction parameter binarization index $dm_p$ is "0", the predicted value $pm_p$ is defined as the prediction direction representative index value $rm_p$. In contrast, when the first bit of the intra prediction parameter binarization index $dm_p$ is "1", the intra prediction parameter index calculating unit then decodes the 2nd to (k+1)th bits of the intra prediction parameter binarization index $dm_p$ and calculates the prediction direction representative index value $rm_p$ for the value $RM_p$ which the intra prediction parameter index calculating unit acquires by decoding the 2nd to (n+1)th bits of the intra prediction parameter binarization index $dm_p$ according to the following equation.

$$RM_p = = \tilde{r}m_p$$

$$rm_p = RM_p \ (RM_p < pm_p - 1)$$

$$rm_p = RM_p + 1 \ (RM_p > pm_p - 1)$$

Next, when the first bit of the intra prediction parameter binarization index $dm_p$ is "0", the intra prediction parameter index calculating unit 43 decodes the 2nd to (k+1)th bits of the intra prediction parameter binarization index $dm_p$; otherwise, i.e., when the first bit is "1", the intra prediction parameter index calculating unit decodes the (n+2)th to (n+k+1)th bits of the intra prediction parameter binarization index $dm_p$ and defines the decoded result as the prediction direction differential index $dr_p$.

The moving image decoding device decodes the intra prediction parameter on the basis of the prediction direction representative index and the prediction direction differential index, like the moving image encoding device. When the encoding mode assigned to the target block to be encoded is an inter encoding mode, the variable length decoding unit 31 decodes the inter prediction parameter for each of one or more partitions which are included in the target block to be decoded (target block to be encoded) and each of which is a prediction unit. The variable length decoding unit 31 further divides each of the one or more partitions which is a prediction unit into one or more partitions each of which is a transform processing unit on the basis of transform block size information included in the prediction difference encoding parameter, and decodes the compressed data (the transform coefficients transformed and quantized) for each partition which is a transform processing unit (step ST24).

When the encoding mode m(B″) variable-length-decoded by the variable length decoding unit 31 is an intra encoding mode (in the case of m(B″)∈INTRA), the select switch 33 outputs the intra prediction parameter variable-length-decoded by the variable length decoding unit 31 to the intra prediction unit 34. In contrast, when the encoding mode m(B″) variable-length-decoded by the variable length decoding unit 31 is an inter encoding mode (in the case of m(B″)∈INTER), the select switch outputs the inter prediction parameter and the motion vector which are variable-length-decoded by the variable length decoding unit 31 to the motion compensation unit 35.

When the encoding mode m(B″) variable-length-decoded by the variable length decoding unit 31 is an intra encoding mode (in the case of m(B″)∈INTRA) and the intra prediction unit 34 receives the intra prediction parameter from the select switch 33 (step ST25), the intra prediction unit 34 carries out the intra prediction process on each partition $P_i^n$ in the target block to be decoded B″ by using the intra prediction parameter outputted from the select switch 33 while referring to the local decoded image stored in the memory 37 for intra prediction according to the same procedure as that according to which the intra prediction unit 4 shown in FIG. 1 does to generate an intra prediction image $P_{INTRAi}^n$ (step ST26).

When the encoding mode m(B″) variable-length-decoded by the variable length decoding unit 31 is an inter encoding mode (in the case of m(B″)∈INTER), and the motion compensation unit 35 receives the target block to be encoded B″ from the select switch 33 (step ST25), the motion compensation unit 35 carries out the inter prediction process on the target block to be decoded by using the motion vector and the inter prediction parameter which are outputted from the select switch 33 while referring to the decoded image which is stored in the motion-compensated prediction frame memory 39 and on which the filtering process is performed to generate an inter prediction image $P_{INTERi}''$ (step ST27).

When receiving the compressed data and the prediction difference encoding parameter from the variable length decoding unit 31, the inverse quantization/inverse transformation unit 32 inverse-quantizes the compressed data by referring to the prediction difference encoding parameter according to the same procedure as that according to which the inverse quantization/inverse transformation unit 8 shown in FIG. 1 does, and also carries out an inverse orthogonal transformation process on the transform coefficients which are the compressed data which the inverse quantization/inverse transformation unit inverse-quantizes by referring to the prediction difference encoding parameter to calculate a decoded prediction difference signal corresponding to the prediction difference signal outputted from the subtraction unit 6 shown in FIG. 1 (step ST28).

The adding unit 36 adds the decoded prediction difference signal calculated by the inverse quantization/inverse transformation unit 32 and the intra prediction image $P_{INTRAi}''$ generated by the intra prediction unit 34 or the inter prediction image $P_{INTERi}''$ generated by the motion compensation unit 35 to generate and output a decoded image, as a collection of one or more decoded partition images included in the target block to be decoded, to the loop filter unit 38, and also stores the decoded image in the memory 37 for intra prediction (step ST29). This decoded image is the image signal for subsequent intra prediction.

When completing the processes of steps ST23 to ST29 on all the target blocks to be decoded B'' (step ST30), the loop filter unit 11 carries out a predetermined filtering process on the decoded image outputted from the adding unit 36, and stores the decoded image on which the loop filter unit carries out the filtering process in the motion-compensated prediction frame memory 39 (step ST31). This decoded image is a reference image for motion-compensated prediction, and is also a reproduced image.

When decoding the intra prediction parameter, the variable length decoding unit 31 of the moving image decoding device shown in FIG. 10 can correctly decode the intra prediction parameter which has been encoded with reduced code amount by entropy-decoding both the index indicating the representative prediction direction vector (prediction direction representative vector) which is selected from among the prediction direction vectors of a plurality of directional predictions, and the index (prediction direction differential index) indicating the difference between the prediction direction vector and the prediction direction representative vector by using arithmetic decoding according to their respective probability models, or the like.

As can be seen from the above description, because the variable length encoding unit 13 of the moving image encoding device in accordance with this Embodiment 1 is constructed in such a way as to determine a prediction direction vector (prediction direction representative vector) whose direction is the closest to that of the prediction direction vector shown by the intra prediction parameter of an already-encoded blocks which are adjacent to a target block to be encoded outputted from the block dividing unit 1, and variable-length-encode an index indicating the prediction direction representative vector and also variable-length-encode an index indicating the difference between the prediction direction vector shown by the intra prediction parameter of the already-encoded block and the prediction direction representative vector, as variable length encoding of the intra prediction parameter determined by the encoding controlling unit 2, there is provided an advantage of being able to prevent even an increase in the number of selectable directional prediction modes from causing an increase in the code amount of information about intra prediction modes.

Further, because the variable length decoding unit 31 of the moving image decoding device according to this Embodiment 1 is constructed in such a way as to variable-length-decode the index indicating the prediction direction representative vector and also variable-length-decode the index indicating the difference between the prediction direction vector shown by the intra prediction parameter of an already-decoded block and the prediction direction representative vector, as variable length decoding of the intra prediction parameter, and determine the intra prediction parameter from the index indicating the prediction direction representative vector and the index indicating the above-mentioned difference, there is provided an advantage of being able to correctly decode the bitstream which has been encoded with reduced code amount of the intra prediction parameter without reducing the prediction efficiency.

Embodiment 2

In above-mentioned Embodiment 1, the intra prediction unit 4 of the moving image encoding device handles both the luminance signal and the color difference signals in the video signal in the same way as each other, and carries out the intra prediction process on each target block to be encoded of the luminance signal and the intra prediction process on each target block to be encoded of each of the color difference signals separately and independently. To this end, the variable length encoding unit 13 individually variable-length-encodes the intra prediction parameter which is used when the moving image encoding device carries out the intra prediction process on each target block to be encoded of the luminance signal, and the intra prediction parameter which is used when the moving image encoding device carries out the intra prediction process on each target block to be encoded of each of the color difference signals to multiplex them into the bitstream. In this case, for example, when the characteristics of each target block to be encoded of the luminance signal are similar to those of the corresponding target block to be encoded of each of the color difference signals, and the intra prediction parameters which are used when the moving image encoding device carries out intra prediction processes on both the target blocks to be encoded are nearly the same as each other, one of the intra prediction parameters which are multiplexed into the bitstream is redundant.

To eliminate this redundancy, in this Embodiment 2, an example in which when generating a prediction image of each of the color difference signals, if the characteristics of a target block to be encoded of the luminance signal are similar to those of a corresponding target block to be encoded of each of the color difference signals, for example, an intra prediction unit 4 carries out an intra prediction process on the target block to be encoded of each of the color difference signals by using the same intra prediction parameter as that which is used for carrying out the intra prediction process on the target block to be encoded of the luminance signal, thereby eliminating the intra prediction parameter which is to be multiplexed into the bitstream, will be explained.

Figure 13:
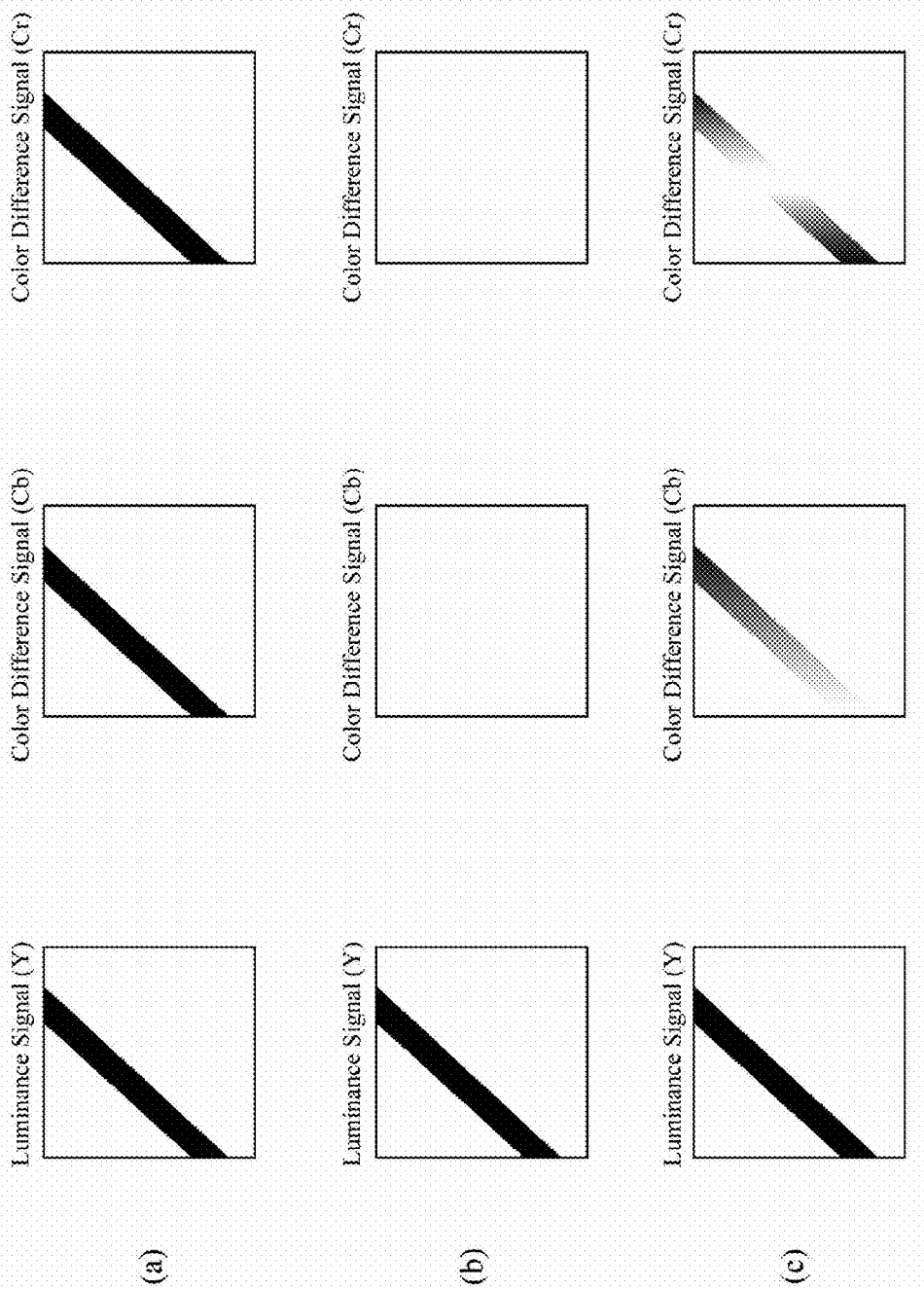
FIG. 13 is an explanatory drawing showing an example of a partition P$_i^n$ of a luminance signal and partitions P$_i^n$ of color difference signals.

Concretely, the intra prediction unit carries out the intra prediction process in the following way. FIG. 13 is an explanatory drawing showing an example of a partition $P_i''$ of the luminance signal and partitions $P_i^n$ of the color difference signals. When the luminance signal (Y) in the partition $P_i^n$ has an edge, as shown in FIG. 13(a), the intra prediction unit 4 of the moving image encoding device uses a characteristic that a similar edge also exists in each of the color difference signals (Cb and Cr) in many cases to apply the intra prediction parameter applied to the luminance signal as the intra prediction parameter of each of the color difference signals, just as it is, to generate an intra prediction image. However, there is a case in which when the luminance signal (Y) in the partition $P_i^n$ has an edge, but this is a one of gray scale, as shown in FIG. 13(b), the color difference signals (Cb and Cr) have no edge. In such a case, the intra prediction unit applies an average prediction to the partitions without applying the intra prediction parameter of the luminance signal to the partitions to generate an intra prediction image.

Figure 14:
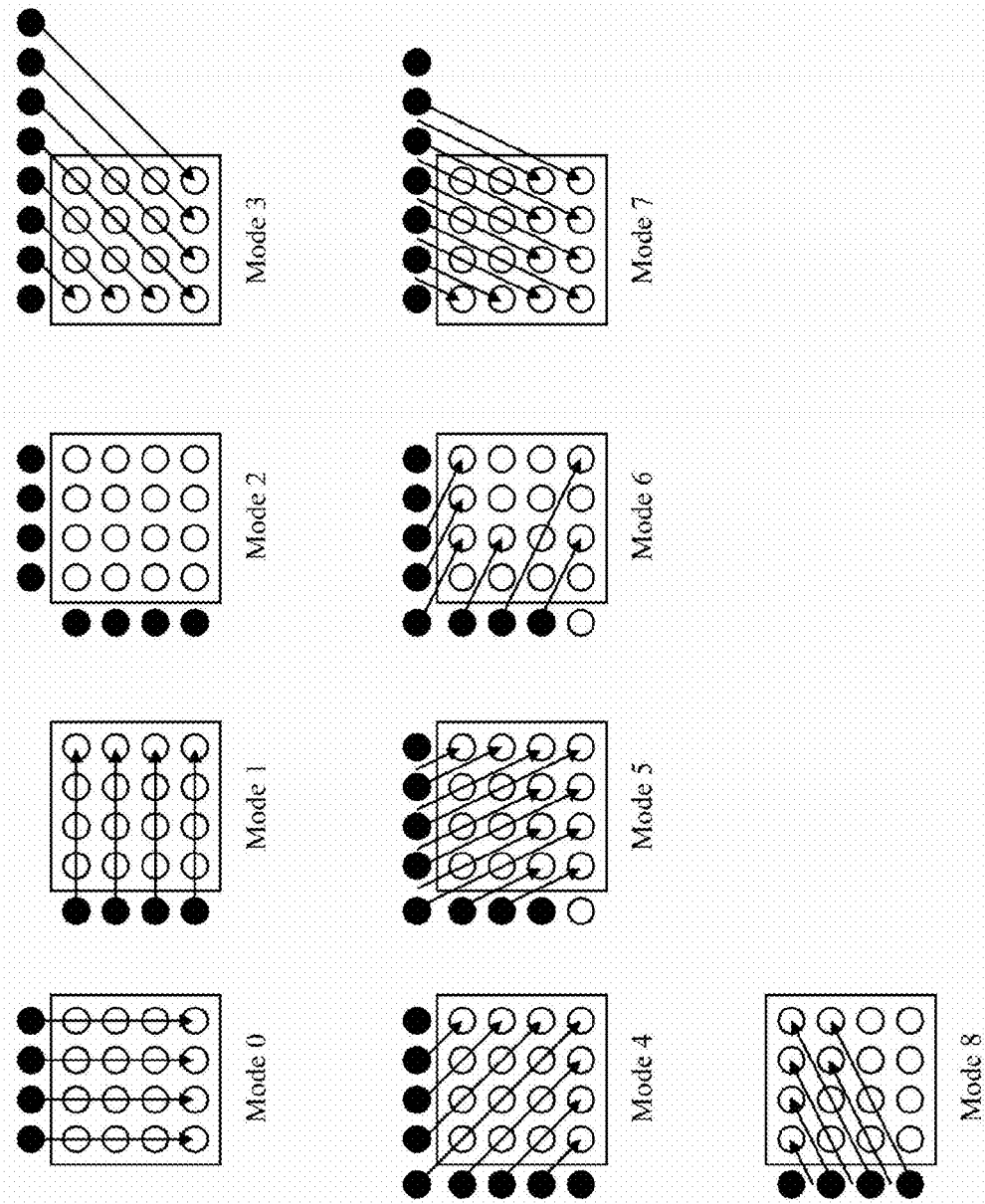
FIG. 14 is an explanatory drawing showing a prediction image yet to be filtered and a prediction image filtered.

Further, as shown in FIG. 13(c), there is a case in which even when the luminance signal (Y) of the partition $P_i^n$ has an edge, an edge whose boundary gets blurred or is broken exists in each of the color difference signals (Cb and Cr). In such a case, there is a possibility that a prediction residual becomes large in a pixel existing in a region where an edge's boundary gets blurred or is broken, and therefore the code amount related to the prediction residual increases. In order to avoid the occurrence of such a situation in which the code amount related to the prediction residual increases, after carrying out the intra prediction process on each target block to be encoded of each of the color difference signals by using the same intra prediction parameter as that which the moving image encoding device uses when carrying out the intra prediction process on each target block to be encoded of the luminance signal to generate a prediction image, as shown in FIG. 14, the moving image encoding device carries out smoothing filtering on the prediction image in such a way that all edges become blurred. In this case, the prediction image on which the moving image encoding device carries out the filtering process is the prediction image for the color difference signal.

While a variable length encoding unit 13 variable-length-encodes the intra prediction parameter, which is applied to the luminance signal, and then multiplexes the prediction parameter encoded thereby into the bitstream, like that according to above-mentioned Embodiment 1, the variable length encoding unit processes the intra prediction parameter applied to each of the color difference signals in the following way. More specifically, the variable length encoding unit 13 carries out the intra prediction process on each target block to be encoded of each of the color difference signals by using the same intra prediction parameter as that for the luminance signal, instead of the intra prediction parameter which is applied to each of the color difference signals, without variable-length-encoding the intra prediction parameter which is applied to each of the color difference signals, or entropy-encodes a 1-bit flag showing whether or not an average prediction is applied to each target block to be encoded of each of the color difference signals by using arithmetic encoding or the like. As a result, the 1-bit flag is multiplexed into the bitstream as the intra prediction parameter applied to each of the color difference signals. In addition, when carrying smoothing filtering on the prediction image as needed, the variable length encoding unit entropy-encodes a 1-bit flag showing whether or not smoothing filtering is carried out on the prediction image by using arithmetic encoding or the like.

In this embodiment, the example in which when not applying the intra prediction parameter of the luminance signal to the generation of a prediction image of each of the color difference signals, the intra prediction unit 4 applies an average prediction to each of the color difference signals to generate an intra prediction image is shown. As an alternative, the intra prediction unit can selectively apply one of a plurality of modes (directional prediction modes) including a horizontal prediction and a vertical prediction in addition to an average prediction, the plurality of modes corresponding to a plurality of representative prediction direction vectors, respectively, to each of the color difference signals to generate a prediction image. Further, the intra prediction unit determines the prediction image which the intra prediction unit generates by applying the directional prediction mode selected thereby to each of the color difference signals as the prediction image of each of the color difference signals.

A variable length decoding unit 31 of a moving image decoding device shown in FIG. 10 variable-length-decodes the 1-bit flag from the bitstream as the intra prediction parameter applied to each of the color difference signals. When the flag variable-length-decoded by the variable length decoding unit 31 shows that the intra prediction process is carried out on each target block to be encoded of each of the color difference signals by using the same intra prediction parameter as that for the luminance signal, the intra prediction unit 34 carries out an intra prediction process on each target block to be decoded (target block to be encoded) of each of the color difference signals by using the same intra prediction parameter as that for the luminance signal to generate a prediction image of each of the color difference signals, like the intra prediction unit 4 shown in FIG. 1. In contrast, when the flag shows that an average prediction is applied to each of the color difference signals (when the flag shows that no intra prediction process is carried out on each target block to be encoded of each of the color difference signals by using the same intra prediction parameter as that for the luminance signal), the intra prediction unit 34 applies an average prediction to each of the color difference signals to carry out the intra prediction process on each target block to be decoded of each of the color difference signals to generate a prediction image of each of the color difference signals, like the intra prediction unit 4 shown in FIG. 1. In contrast, when the flag shows that a horizontal prediction (or a vertical prediction) is applied to each of the color difference signals, the intra prediction unit applies a horizontal prediction (or a vertical prediction) to each of the color difference signals to carry out the intra prediction process on each target block to be decoded of each of the color difference signals to generate a prediction image of each of the color difference signals.

When the variable length decoding unit 31 has variable-length-decoded the 1-bit flag showing whether or not smoothing filtering is carried out on the prediction image, after carrying out the intra prediction process on each target block to be decoded of each of the color difference signals to generate a prediction image of each of the color difference signals by using the same intra prediction parameter as that for the luminance signal, the intra prediction unit 34 carries out smoothing filtering on the prediction image when the flag shows that smoothing filtering is carried out on the prediction image. In this case, the prediction image on which the filtering process is carried out is the prediction image of each of the color difference signals.

As can be seen from the above description, because the moving image encoding device in accordance with this Embodiment 2 is constructed in such a way that when generating a prediction image of each of the color difference signals, the intra prediction unit 4 carries out the intra prediction process on each target block to be encoded of each of the color difference signals by using the same intra prediction parameter as the intra prediction parameter which the intra prediction unit uses when carrying out the intra prediction process on each target block to be encoded of the luminance signal, or applies an average prediction to each of the color difference signals and carries out the intra prediction process on each target block to be encoded of each of the color difference signals, and the variable length encoding unit 13 variable-length-encodes a flag showing whether the intra prediction unit 4 carrying out the intra prediction process on each target block to be encoded of each of the color difference signals by using the same intra prediction parameter as the intra prediction parameter which the intra prediction unit uses when carrying out the intra prediction process on each target block to be encoded of the luminance signal, there is provided an advantage of being able to reduce the code amount related to the intra prediction mode of each of the color difference signals without reducing the prediction efficiency.

Further, because the intra prediction unit 4 of the moving image encoding device according to this Embodiment 2 is constructed in such a way as to carry out the intra prediction process on each target block to be encoded of each of the color difference signals to generate a prediction image of each of the color difference signals, and, after that, carries out smoothing filtering on the prediction image, there is provided an advantage of being able to improve the prediction efficiency and reduce the code amount related to a residual signal.

The moving image decoding device according to this Embodiment 2 is constructed in such a way that the variable length decoding unit 31 thereof variable-length-decodes a flag from the bitstream, and, when the flag variable-length-decoded by the variable length decoding unit 31 shows that the intra prediction process is carried out on each target block to be encoded of each of the color difference signals by using the same intra prediction parameter as that for the luminance signal, the intra prediction unit 34 carries out the intra prediction process on each target block to be decoded (target block to be encoded) of each of the color difference signals by using the same intra prediction parameter as that for the luminance signal to generate a prediction image of each of the color difference signals; otherwise, i.e., when the flag shows that no intra prediction process is carried out on each target block to be encoded of each of the color difference signals by using the same intra prediction parameter as that for the luminance signal, the intra prediction unit 34 applies an average prediction to each of the color difference signals to carry out the intra prediction process on each target block to be decoded of each of the color difference signals to generate a prediction image of each of the color difference signals, there is provided an advantage of being able to correctly decode the bitstream which has been encoded with reduced code amount of the intra prediction parameter of each of the color difference signals without reducing the prediction efficiency.

Further, the intra prediction unit 34 of the moving image decoding device according to this Embodiment 2 is constructed in such a way as to carry out the intra prediction process on each target block to be decoded of each of the color difference signals to generate a prediction image of each of the color difference signals, and, after that, carries out smoothing filtering on the prediction image, there is provided an advantage of being able to improve the prediction efficiency, reduce the code amount related to a residual signal, and correctly decode the encoded bitstream.

INDUSTRIAL APPLICABILITY

As mentioned above, because the moving image encoding device, the moving image decoding device, the moving image coding method, and the moving image decoding method in accordance with the present invention make it possible to reduce the code amount related to the intra prediction mode of each of the color difference signals without reducing the prediction efficiency, the moving image encoding device, the moving image decoding device, the moving image coding method, and the moving image decoding method in accordance with the present invention are suitable for use as a moving image encoding device for, a moving image decoding device for, a moving image coding method of, a moving image decoding method of carrying out the intra prediction process or an inter prediction process to carry out predictive encoding, respectively, and so on.

EXPLANATIONS OF REFERENCE NUMERALS

1 block dividing unit (block division unit), 2 encoding controlling unit (encoding control unit), 3 select switch (prediction image generating unit), 4 intra prediction unit (prediction image generating unit), 5 motion-compensated prediction unit, 6 subtraction unit (quantizing unit), 7 transformation/quantization unit (quantizing unit), 8 inverse quantization/inverse transformation unit, 9 adding unit, 10 memory for intra prediction (prediction image generating unit), 11 loop filter unit, 12 motion-compensated prediction frame memory, 13 variable length encoding unit (variable length encoding unit), 13*a* intra prediction parameter variable length encoding unit, 21 intra prediction parameter predicted value calculating unit, 22 intra prediction parameter binarization index calculating unit, 23 entropy encoding unit, 31 variable length decoding unit (variable length decoding unit), 31*a* intra prediction parameter variable length decoding unit, 32 inverse quantization/inverse transformation unit (inverse quantizing unit), 33 select switch (prediction image generating unit), 34 intra-prediction unit (prediction image generating unit), 35 motion compensation unit, 36 adding unit, 37 memory for intra prediction (prediction image generating unit), 38 loop filter unit, 39 motion-compensated prediction frame memory, 41 entropy decoding unit, 42 intra prediction parameter predicted value calculating unit, 43 intra prediction parameter index calculating unit.

The invention claimed is:

1. An image encoding device comprising:
a block dividing unit for dividing an inputted image which comprises a luminance signal and a color difference signal into blocks each of which is a unit for a prediction process;
a prediction image generating unit for carrying out an intra prediction process on the luminance signal and a color difference signal of a target block using an intra prediction parameter to generate a prediction image; and
a variable length encoding unit for performing a variable-length-encoding process on the intra prediction parameter,
wherein the prediction image generating unit carries out the intra prediction process on the color difference signal of the target block by using an intra prediction parameter which is the same as an intra prediction parameter which the prediction image generating unit used to carry out the intra prediction process on the luminance signal of the target block or by using an average prediction process, and the variable length encoding unit generates a coded data indicating one of the intra prediction processes on the color difference signal of the target block, the intra prediction processes include at least the intra prediction process using the intra prediction parameter used for the luminance signal of the target block and the intra prediction process using the average prediction process.

2. An image decoding device comprising:

a variable length decoding unit for performing a variable-length-decoding process on an intra prediction parameter; and a prediction image generating unit for carrying out an intra prediction process on a target block by using the intra prediction parameter to generate a prediction image which comprises a luminance signal and a color difference signal;

wherein the variable length decoding unit performs a variable-length-decoding process on a coded data indicating one of the intra prediction processes on the color difference signal of the target block, the intra prediction processes include at least the intra prediction process using the intra prediction parameter which is the same as an intra prediction parameter to be used for the luminance signal of the target block and the intra prediction process using an average prediction process, the prediction image generating unit carries out the intra prediction process on the color difference signal of the target block according to the coded data.

3. An image encoding method comprising:

a step for dividing an inputted image which comprises a luminance signal and a color difference signal into blocks each of which is a unit for prediction process;

a step for carrying out an intra prediction process on the luminance signal and a color difference signal of a target block using an intra prediction parameter to generate a prediction image; and a step for performing a variable-length-encoding process on the intra prediction parameter, wherein the intra prediction process on the color difference signal of the target block is carried out by using the intra prediction parameter which is used to carry out the intra prediction process on the luminance signal of the target block or by using an average prediction process, and the variable-length-encoding process generates a coded data indicating one of the intra prediction processes on the color difference signal of the target block, the intra prediction processes include at least the intra prediction process using the intra prediction parameter which is the same as an intra prediction parameter used for the luminance signal of the target block and the intra prediction process using the average prediction process.

4. An image decoding method comprising:

a step for performing a variable-length-decoding process on an intra prediction parameter; and a step for carrying out an intra prediction process on a target block by using the intra prediction parameter to generate a prediction image which comprises a luminance signal and a color difference signal;

wherein the intra prediction process on the color difference signal of the target block is carried out according to a coded data indicating one of the intra prediction processes on the color difference signal of the target block, the intra prediction processes include at least the intra prediction process using the intra prediction parameter which is the same as an intra prediction parameter used for the luminance signal of the target block and the intra prediction process using an average prediction process.

5. A non-transitory computer-readable storage medium storing a bitstream generated by performing a block based prediction process on an input image, the bit stream comprising:

a coding mode indicating whether a block of the input image is predicted by an inter coding mode or an intra coding mode;

an intra prediction parameter used to generate a luminance signal of an intra prediction image for an intra prediction block predicted by the intra coding mode; and a coded data indicating one of intra prediction processes on a color difference signal of a target block, the intra prediction processes including at least an intra prediction process using the intra prediction parameter which is the same as an intra prediction parameter used to generate the luminance signal of the intra prediction image for the intra prediction block and an intra prediction process using an average prediction process.

* * * * *